(12) United States Patent
Freeman et al.

(10) Patent No.: US 12,253,255 B2
(45) Date of Patent: Mar. 18, 2025

(54) LUMINAIRES WITH LIGHT REFOCUSING ELEMENTS

(71) Applicant: Vode Lighting, LLC, Sonoma, CA (US)

(72) Inventors: Sam Freeman, Santa Rosa, CA (US);
Richard Wong, Santa Rosa, CA (US);
Scott S Yu, Tiburon, CA (US); Eric Mar, San Rafael, CA (US)

(73) Assignee: VODE LIGHTING LLC, Sonoma, CA (US)

( * ) Notice: Subject to any disclaimer, the term of this patent is extended or adjusted under 35 U.S.C. 154(b) by 0 days.

(21) Appl. No.: 17/874,779

(22) Filed: Jul. 27, 2022

(65) Prior Publication Data
US 2024/0035641 A1    Feb. 1, 2024

(51) Int. Cl.
*F21V 5/04* (2006.01)
*F21Y 115/10* (2016.01)

(52) U.S. Cl.
CPC .............. *F21V 5/045* (2013.01); *F21V 5/043* (2013.01); *F21Y 2115/10* (2016.08)

(58) Field of Classification Search
CPC ....... F21V 5/045; F21V 5/043; F21Y 2115/10
See application file for complete search history.

(56) References Cited

U.S. PATENT DOCUMENTS

| | | | | |
|---|---|---|---|---|
| 4,387,367 A * | 6/1983 | Fisher | .................. | H03K 17/943 250/221 |
| 6,231,200 B1 * | 5/2001 | Shinohara | ............ | G02B 6/0046 362/330 |
| 8,027,093 B2 * | 9/2011 | Commander | ........... | B44F 1/045 359/619 |
| 9,146,419 B1 * | 9/2015 | Anandan | .............. | G02B 6/0073 |
| 2007/0110386 A1 * | 5/2007 | Chiang | ................ | G02B 5/0242 385/901 |
| 2012/0281163 A1 * | 11/2012 | Lee | ................... | G02F 1/133606 428/688 |

(Continued)

FOREIGN PATENT DOCUMENTS

CN           204164735 U  *  2/2015

OTHER PUBLICATIONS

English translation of Zhao CN-204164735-U, published Feb. 2015 (Year: 2015).*

*Primary Examiner* — Evan P Dzierzynski
(74) *Attorney, Agent, or Firm* — ArentFox Schiff LLP; Joseph M. Maraia

(57) ABSTRACT

An augmented lens assembly for use with a light source featuring a main lens component having one or a plurality of light refocusing elements associated with the main lens and arranged along at least one surface of the main lens of the lens assembly that provides for improved uniformity in light distribution and improved illumination. Luminaires featuring one or a plurality of augmented lens assemblies, associated light sources and optionally, baffles, further featuring one or more main lens components having one or more light refocusing elements associated with the main lens portion and arranged along at least one surface of the main lens to provide for improved uniformity in light distribution, improved illumination and aesthetic improvements to the visual appearance of the luminaires when observed in either a lighted or non-lighted condition.

12 Claims, 12 Drawing Sheets

(56) References Cited

U.S. PATENT DOCUMENTS

| | | | | |
|---|---|---|---|---|
| 2014/0078441 | A1* | 3/2014 | Wang | G02B 6/0088 |
| | | | | 29/700 |
| 2016/0238774 | A1* | 8/2016 | Koike | G02B 6/0055 |
| 2020/0049878 | A1* | 2/2020 | Fattal | G02B 30/26 |
| 2020/0166687 | A1* | 5/2020 | Welna | G02B 6/005 |
| 2020/0203322 | A1* | 6/2020 | Perez-Bravo | H01L 33/52 |
| 2021/0190293 | A1* | 6/2021 | Diana | F21S 8/086 |

* cited by examiner

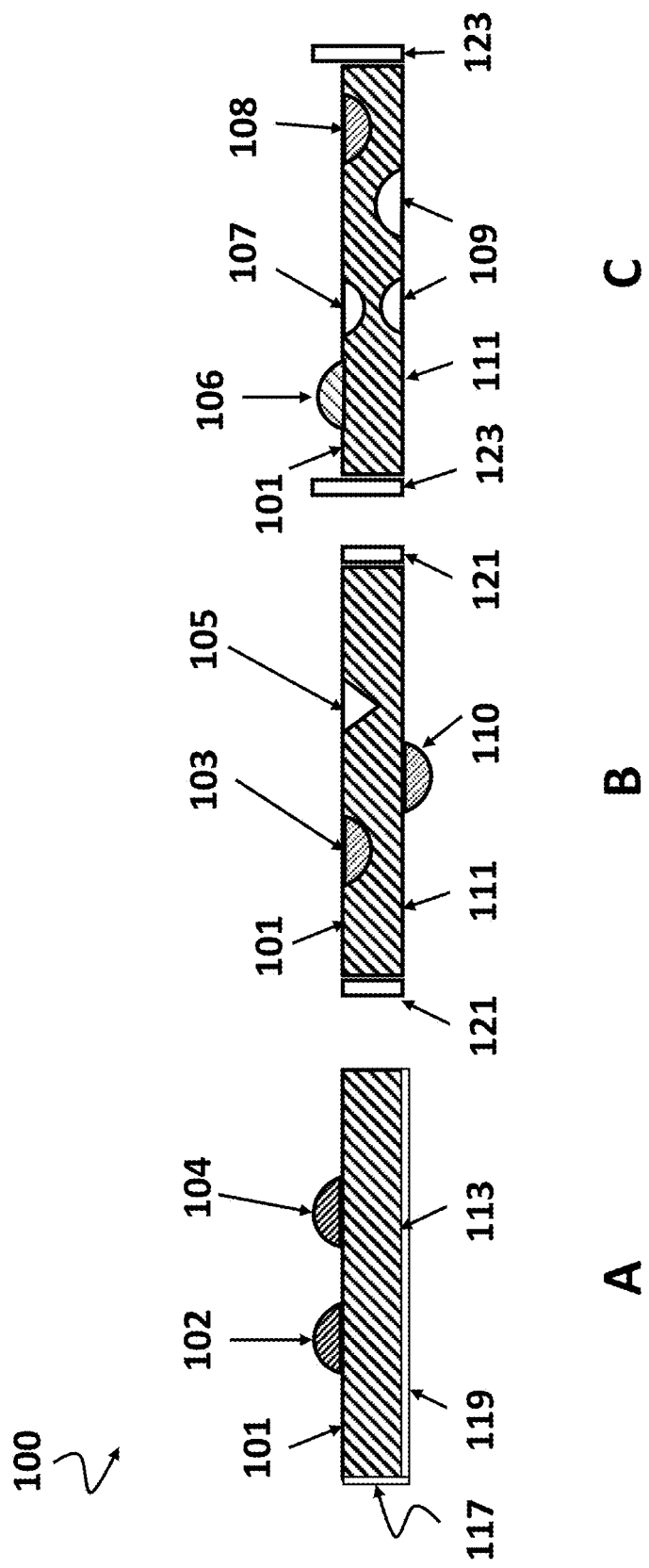

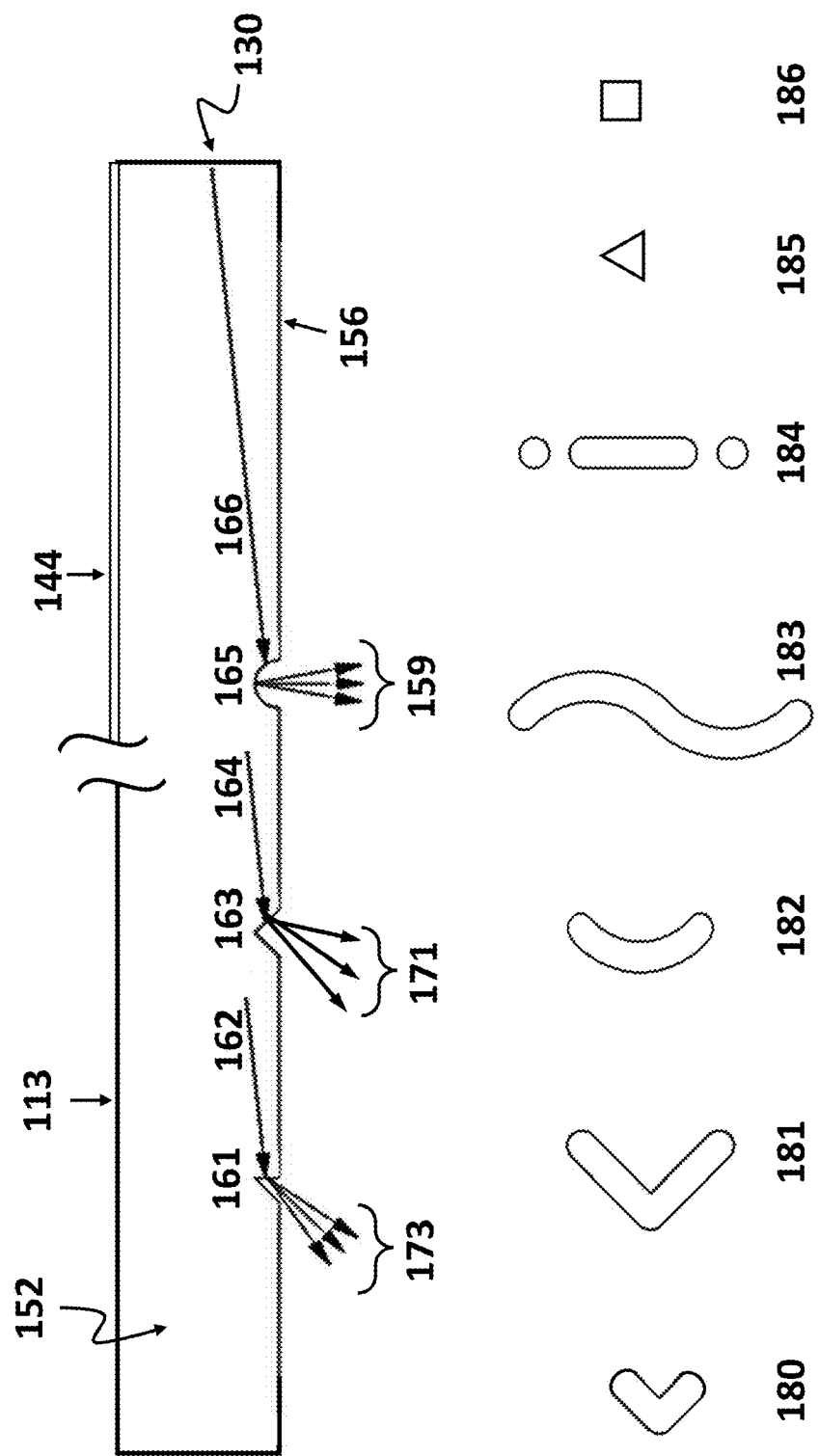

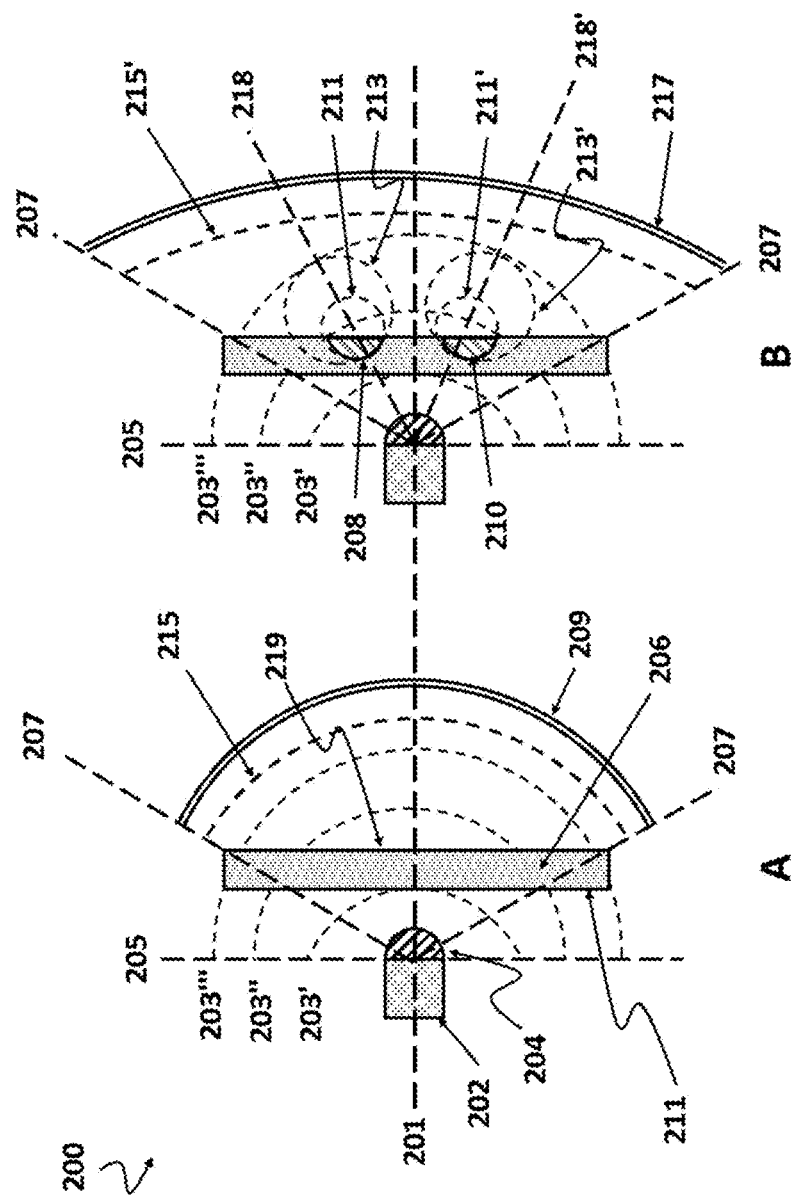

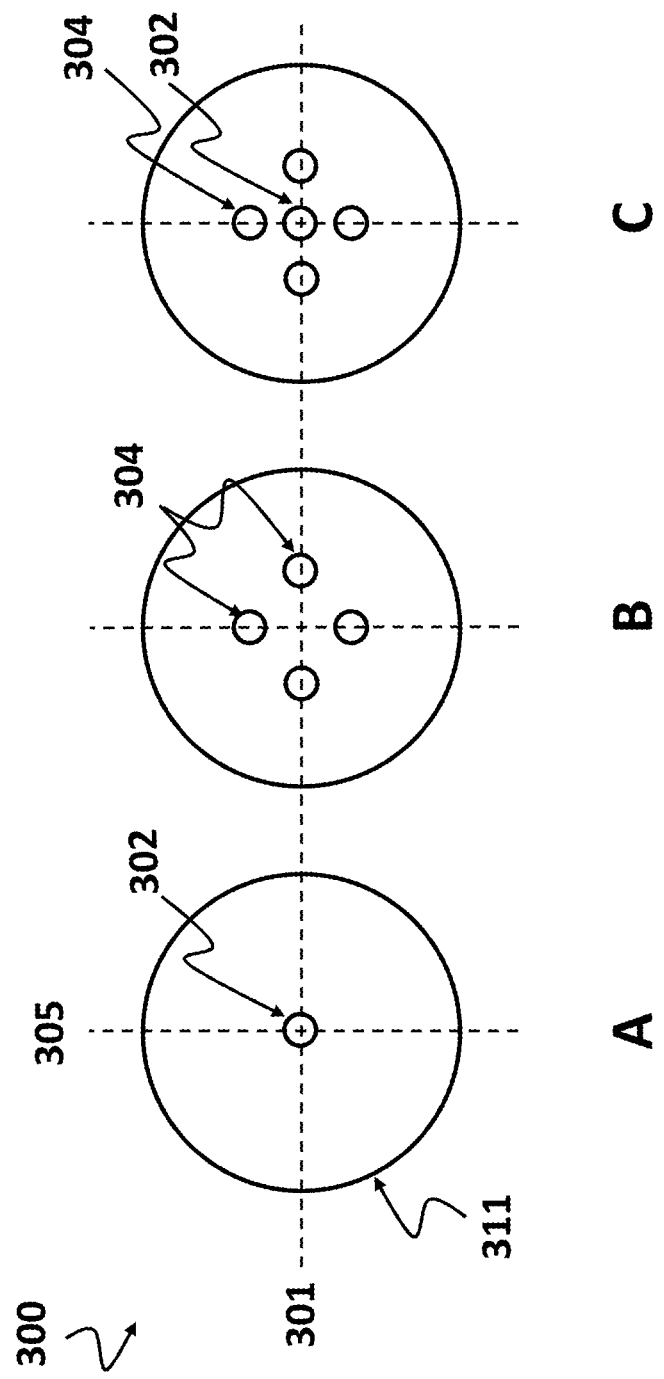

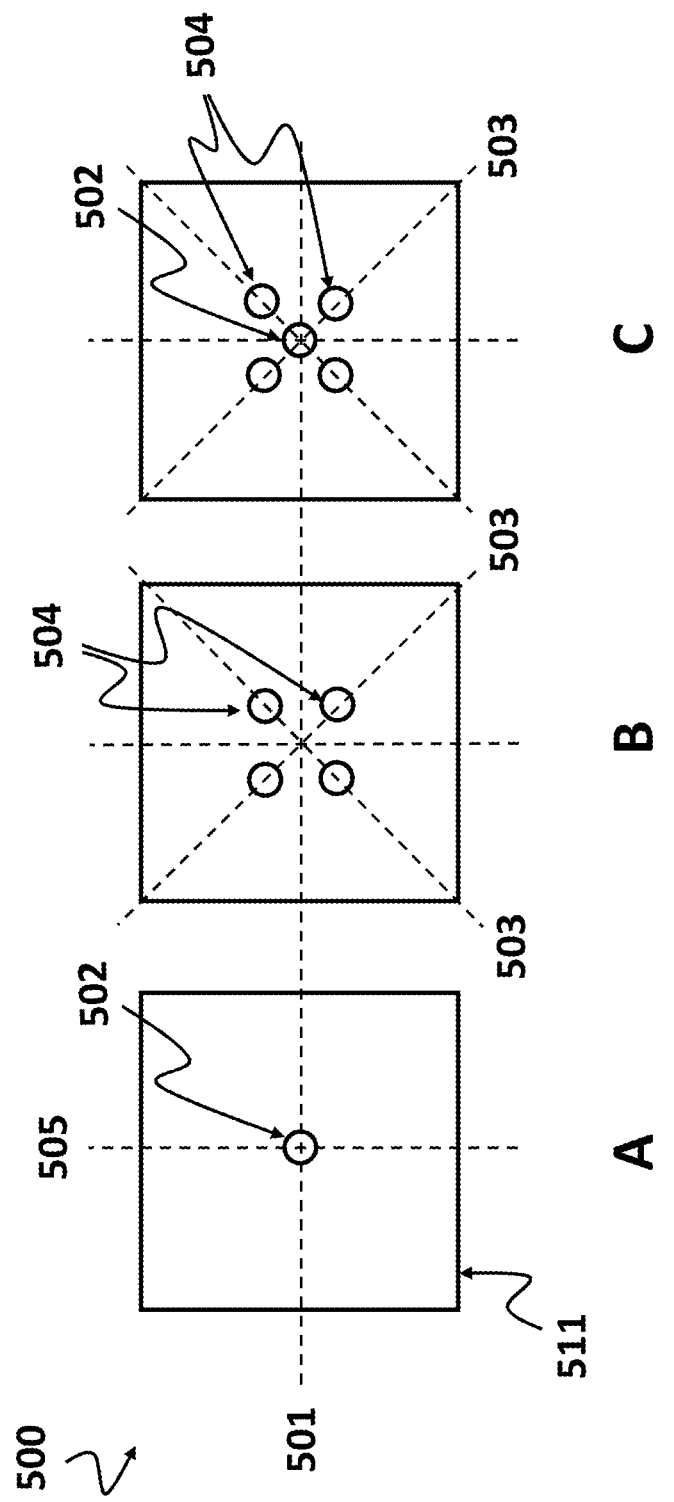

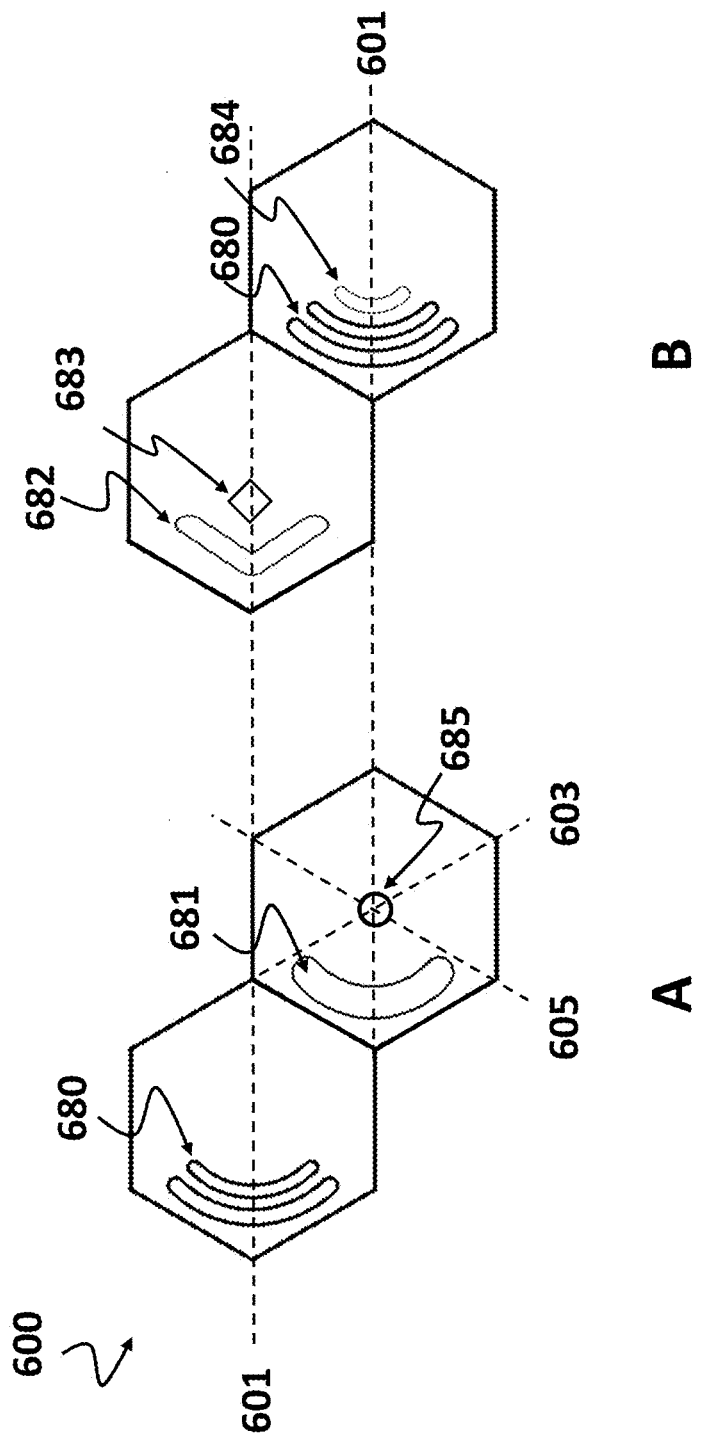

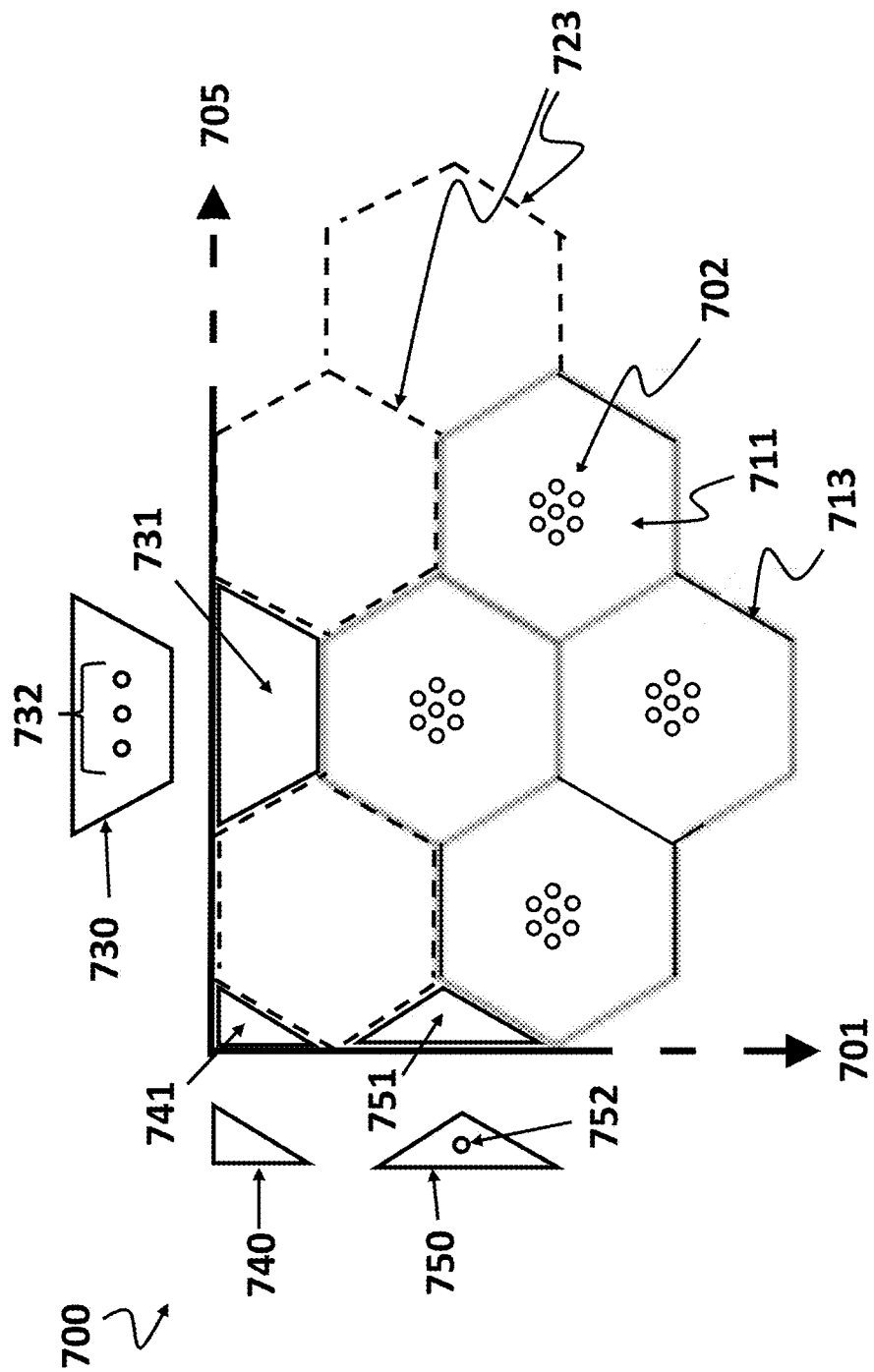

LUMINAIRES WITH LIGHT REFOCUSING ELEMENTS

BACKGROUND

It is known to use light emitting sources, including for example, but not limited to, incandescent lamps, fluorescent tubes, and solid state light sources including, but not limited to light emitting diodes (LEDs), LED arrays, Lambertian emitters, $2\pi$ emitters, and fiber optic light guides, in a variety of applications, including, but not limited to, retail and commercial lighting applications where a uniform lighting field is desirable. Specifically, linear LED sources and LED arrays are increasingly finding applications in retail, commercial, and general lighting applications since their radiative light outputs have increased exponentially, prices have fallen significantly over the past few years and reliability of the materials have improved significantly, leading to lower installation and less frequent repair and replacement. LEDs are attractive due to their small size and the fact that they consume less power relative to incandescent and fluorescent light sources. The popularity of LEDs as light sources is expected to continue and increase as their potential benefits are further developed, particularly with respect to increased light output.

Available LEDs come in different sizes and different emitting cone angles. An emitting cone angle is typically referred to as $2\phi$. LEDs emit light over a wide range of cone angles, ranging from 15 degrees (forward emitting or side emitting) to 180 degrees (hemispherical emitting). It is therefore very important to construct efficient light dispersal assemblies to harness the maximum possible light output from LEDs and direct it in a predetermined and controlled manner. Generally, these LED arrays are simply substituted into existing luminaires as an improved light source, but uniformity of the emitted light, even with a typical diffuser lens in place, is poorer due to the nature of the point source emissivity of the LEDS, even when combined and spaced at closer distances such as in a linear LED array designed to replace a fluorescent tube.

There is a need in the lighting systems field to create lighting systems and luminaires with improved and more uniform field illumination and which can be used with any type of light source or solid-state light source such as an LED to direct light in a predetermined manner. According, there is also a need for improved lenses and light dispersion means that function better with point source emission devices, like LEDs, including back and edge-lit configurations and as well with linear LED arrays, which are able to better disperse incident light to create a brighter, more uniform, and improved field of illumination. This invention provides such an improved light dispersing lens system and luminaire system in the form of lighting components with novel lenses featuring one or a plurality of light refocusing elements incorporated therewith.

SUMMARY

The present invention, as disclosed by the various inventive embodiments described hereinbelow, addresses these requirements by providing luminaire lighting units with improved light dispersing lens systems in the form of lenses and light guide plates (LGP) featuring one or a plurality of light refocusing elements. According to embodiments of the disclosure, the improved lens systems feature lenses having associated light refocusing elements associated with either a first or second side or both sides of the lens surface, in the form of either generally convex (negative) or concave (positive) refocusing elements, and alternatively, scattering or unfocusing optical elements, and combinations thereof. In one related embodiment, a main lens features one or a plurality of convex refocusing elements on a first surface. In a closely related embodiment, a main lens features one or a plurality of convex refocusing elements on a first surface wherein the elements are uniformly positioned with respect to at least one axis corresponding to the geometry of the main lens. In a second related embodiment, a main lens features one or a plurality of concave refocusing elements on a first surface, the elements uniformly positioned with respect to at least one axis corresponding to the geometry of the main lens. In a third related embodiment, a main lens features a combination of at least one or a plurality of concave and convex refocusing elements on a first surface, the elements uniformly positioned with respect to each other and with respect to at least one axis corresponding to the geometry of the main lens. In further related embodiments of the disclosure, the improved lens comprises a main lens with a first surface and a second surface wherein said first and second surfaces thereof each feature a combination of at least one or a plurality of concave and convex refocusing elements. In the embodiments disclosed above, the source of light or illumination may be from a back side for propagation through the body of the lens and as modified by the plurality of light refocusing elements, or alternatively the modified lenses may be illuminated from one of more sides by means of edge (side) injected illumination. In related embodiments the main lens itself may be substantially flat or planer, or alternatively curved on one or both of its surfaces, and bear one or a plurality of a light refocusing element according to the present disclosure on at least one surface of the main lens. In further related embodiments, the lens is a light guide plate (LGP) which is illuminated by the injection of light into one side or one edge of the plate, relying on internal reflections within to transport the light throughout the lens and transmit it as modified by the presence of one or a plurality of light refocusing elements associated with the lens.

Based on ray-tracing results, but without being bound by theory, it is believed that the combination of the main lens and at least one or a plurality of light refocusing elements act together to produce an augmented illumination wavefront that is more uniform in intensity over the illumination area produced by a point-source or linear source of incident radiation that is diffused by the combination in comparison to that of the non-augmented main lens itself. In a typical luminaire and lens system, a point source LED that produces a spherical wavefront will illuminate an optical plane in an uneven pattern, with maximum intensity near the apex or center axis of illumination passing through the center of the LED. A lens placed to intercept and further disperse the incident light from the point source LED is thus typically used, and depending on the nature of the lens, size, thickness, distance from LED (focal distance) and distance to the illumination plane, can result in improved light dispersion and uniformity of illumination onto the plane. Nevertheless, these typical luminaires tend to produce higher intensities near the center axis of illumination that tapers off from a center to the sides owing to the inverse square law associated with an expanding radiation source. Accordingly, inventive embodiments of the present disclosure describe light refocusing elements that may be associated with one or more surfaces of the main lens or dispersing lens portion of the luminaire lighting system to modify the illumination wavefront to a more even distribution, by employing one or a plurality of convex (defocusing), concave (focusing) elements and/or unfocusing and/or scattering elements that act together with the mains lens and plurality of each other to effectively redirect, refocus, defocus, unfocus, scatter or otherwise modify the emitted illumination wavefront into a more desired or uniform illumination pattern.

In luminaires employing traditional edge-lit light guide plates (LGP), the nature of the side illumination (typically with an LED) often results in higher illumination near the injection sight and near edges where edge-reflected internally redirected light emanates from the lens to a greater extent compared to a center region, resulting in a lack of uniformity. In contrast, in embodiments according to the present disclosure that employ edge-lit light guide plates, the light refocusing elements augment the lens and are employed for the purpose of creating either a more uniform illumination front across the lens, or conversely to produce unique lighting patterns by means of modifying the pattern of internal light reflections and subsequent external illumination provided.

Additional embodiments of the present disclosure include luminaires featuring combinations of various shapes and sizes of augmented lens and lens assemblies each featuring a light source and an improved light dispersing lens systems, optionally including one or more baffles, each using a main lens with one or a plurality of the disclosed light refocusing elements present in order to provide a more uniform plane of illumination from a luminaire.

BRIEF DESCRIPTION OF THE DRAWINGS

FIG. 1A is a cross-sectional representation of three embodiments (A, B, C) of lenses with various exemplary configurations of light refocusing elements with optional reflective coatings and optional baffles.

FIG. 1C is a cross-sectional representation of an edge-lighted internally reflective lens featuring a plurality of differently shaped and patterned light refocusing elements.

FIG. 2 is a cross-sectional comparison of luminaires with one exemplary embodiment featuring a refocusing lens component bearing a plurality of refocusing elements showing propagation patterns of emitted light.

FIG. 3 is a top-view illustration of three embodiments (A, B, C) of circular lenses with various exemplary configurations of light refocusing elements.

FIG. 5 is a top-view illustration of three embodiments (A, B, C) of rectangular (square) lenses with various exemplary configurations of light refocusing elements.

FIG. 6B is a top-view illustration of two embodiments (A, B) of polygonal (hexagonal) lenses with various exemplary configurations of light refocusing elements.

FIG. 7 is a front-view illustration of a luminaire panel with a plurality of differently shaped lighting components in a space-filling propagation pattern.

Figure 1B:
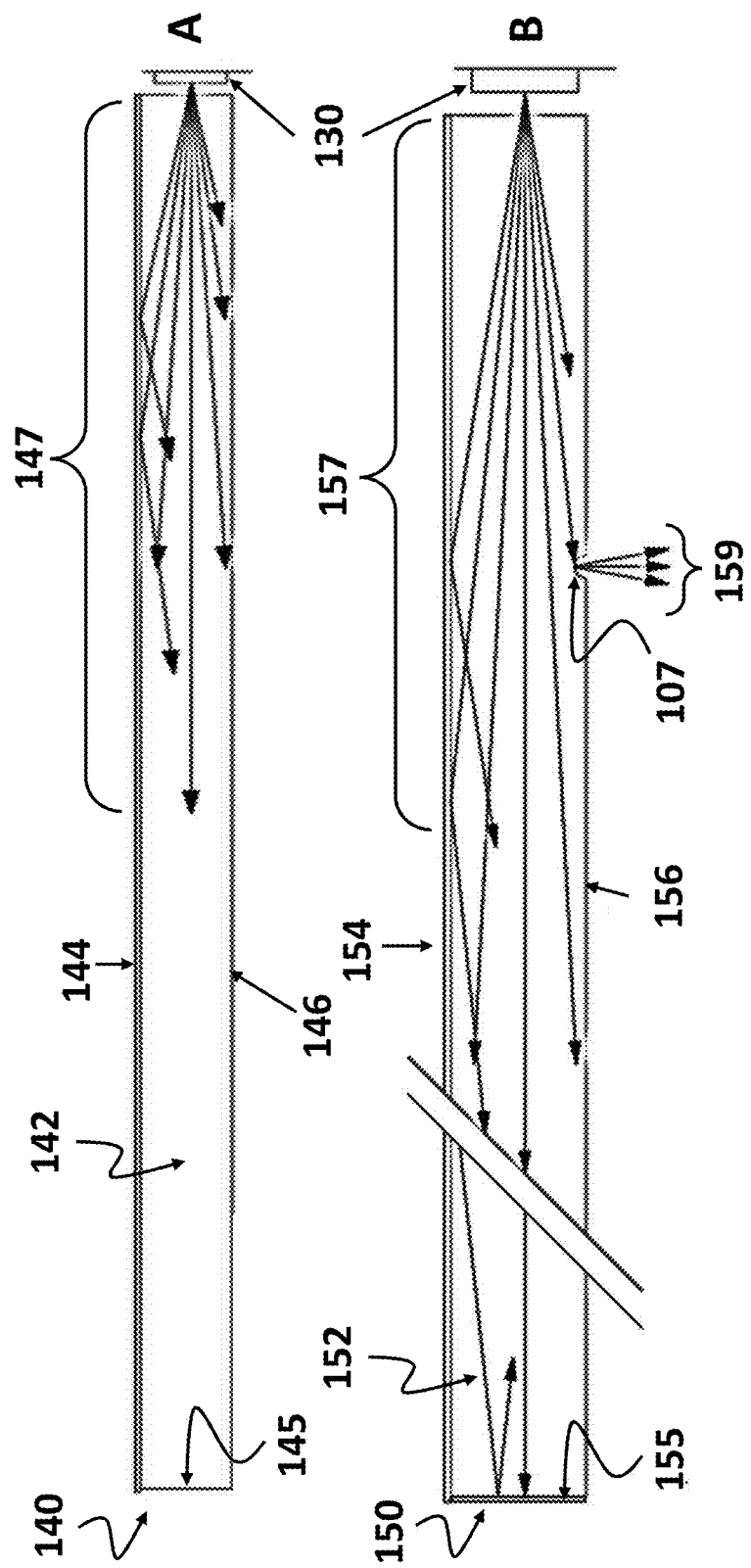
FIG. 1B is a cross-sectional representation of an edge-lighted internally reflective lens (B) featuring a light refocusing element compared to a traditional lens element (A).

A corresponding Figure Key detailing the specific component parts, regions, and configuration of embodiments of the inventive disclosure is attached to this Application in an Appendix, which is incorporated herein in its entirety.

DESCRIPTION

Generality of Invention

This application should be read in the most general possible form. This includes, without limitation, the following:

References to specific techniques include alternative and more general techniques, especially when discussing aspects of the invention, or how the invention might be made or used.

References to "preferred" techniques generally mean that the inventor contemplates using those techniques, and thinks they are best for the intended application. This does not exclude other techniques for the invention and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

General Embodiments

One embodiment of the present disclosure includes an augmented lens assembly for use in a luminaire featuring one or a plurality of main lens components each having a front surface for transmitting illumination, a back surface and at least one side surface for redirecting internally reflected light to the front surface, and at least one side surface for receiving light from a lighting source, wherein the front surface or back surface or both surfaces of the mains lens element(s) bear at least one or a plurality of light refocusing elements; and wherein the lighting source is located adjacent to at least on side or edge of the main lens component.

Another embodiment of the present disclosure includes an augmented lens assembly for use with a light source having a main lens component having a first side and an opposed second side; wherein the first side is oriented to receive incoming light from a light source; wherein the opposed second side is oriented to transmit the incoming light; one or a plurality of refocusing elements associated with either the first side, the second side, or both sides of the main lens component; wherein the light refocusing element is positioned adjacent to either the first or second side of the main lens component; wherein the light refocusing element is selected from a lens having at least one curved surface; and wherein the light refocusing element is positioned along at least one axis of rotation of the main lens component.

One embodiment of the present disclosure includes an augmented lens assembly for use with a light source having a main lens component having a first side, a second side opposed to the first side and at least on side edge; wherein the side edge is oriented to receive incoming light from a light source; wherein the opposed second side is oriented to transmit the incoming light from the main lens; and one or a plurality of light refocusing elements associated with either the first side, the second side, or both opposed sides of the main lens component; wherein the light refocusing element is positioned adjacent to a surface of either the first or second side of the main lens component.

In related embodiments, the light refocusing element is in the form of an optical material present either as an additive or subtractive feature in the form of an optical material selected from the same material as the main lens, a different material and a void space, and combinations thereof; and wherein the additive element has an optical density that differs from the main lens component; and wherein the subtractive element has an optical density equivalent to air occupying a void space within the main lens material in the shape of an subtractive element.

In further related embodiments, the light refocusing element has a three-dimensional geometric shape selected from a cone, cylinder, tetrahedron, pyramid, cube, cuboid, polyhedron, prism, rectangular cuboid, rectangular parallelepiped, spheroid, and any other three-dimensional geometric shape bearing a least one flat surface that is coplanar with at least one of the surfaces of the first or second side of the main lens component.

In yet further embodiments, the light refocusing element has a three-dimensional geometric shape in the form of a lens selected from, but not limited to, a cylindrical, concave, biconcave, plano-concave, convex, biconvex, plano-convex, aspheric, spherical, conical, frusto-conical, pyramidal, toric, sphero-cylindrical, and combinations thereof.

In other embodiments, the light refocusing element has a projected two-dimensional shape selected from a circle, ellipse, triangle, square, rectangle, trapezoid, pentagon, hexagon, polygon, rhomboid, and combinations thereof, or alternatively, the light refocusing element has a projected one-dimensional shape selected from, but not limited to, a dot, line, catenary, arc, chevron, curve, sinusoidal curve, and combinations thereof; wherein the shape is a projection onto at least one of the surfaces of the first or second side of the main lens component.

Further related embodiments include main lens components wherein at least one surface of a side edge of the main lens component bears a reflective element selected from, but not limited to, a coating, layer, film, or surface treatment, or combination thereof that has a higher degree of internal reflectivity than that of the main lens component.

In yet further embodiments, at least one side edge of the main lens component is adjacent to a baffle, wherein the baffle comprises a material selected from, but not limited to, a light-transmissive, non-light transmissive, opaque, semi-opaque, refractive, and reflective material, and combinations thereof; and wherein the baffle optionally extends outward from the opposed second side of the main lens component.

Related embodiments of the present disclosure include an augmented lens assembly for use with a light source having (a) a main lens component having a first side and an opposed second side; wherein the first side is oriented to receive incoming light from a light source; wherein the opposed second side is oriented to transmit the incoming light; (b) a light source located adjacent to either the first or the second side of the main lens component; (c) one or a plurality of light refocusing elements associated with either the first side, the second side, or both sides of the main lens component; wherein the light refocusing element is positioned adjacent to either a first or second surface of the first or the second side of the main lens component; wherein the light refocusing element is selected from a geometric shape having at least one surface that is not parallel to either the first or second surface of the first or second side of the mains lens component; and wherein the refocusing element is positioned along at least one axis of the main lens component; and (d) optionally, one or a plurality of baffles associated with at least one side edge of the main lens component; wherein the baffle consists of a material selected from light-transmissive, non-light transmissive, opaque, semi-opaque, refractive, and reflective material, and combinations thereof; and wherein the optionally extends outward from the opposed second side of the main lens component.

Additional embodiments describe luminaire assemblies incorporating one of more of the inventive features of the present disclosure, in particular a luminaire with improved lighting uniformity comprising: (a) at least one or a plurality of light sources; (b) at least one or a plurality of augmented lens assemblies configured to receive light from the light source and positioned adjacent to the light source; wherein the augmented lens assembly including: (i) a main lens component having a first side and an opposed second side; wherein the first side is oriented to receive incoming light from a light source; wherein the opposed second side is oriented to transmit the incoming light; (ii) one or a plurality of light refocusing elements associated with either the first side, the second side, or both sides of the main lens component; wherein the refocusing element is positioned adjacent to either the first or second side of the main lens component; wherein the light refocusing element is selected from a geometric shape having at least one surface that is not parallel to either the first or second surface of the first or second side of the mains lens component; (c) optionally, at least one baffle located adjacent to the augmented lens assembly; wherein the baffle may be a material selected from a light-transmissive, non-light transmissive, opaque, semi-opaque, refractive and reflective, and combinations thereof; and wherein the baffle optionally extends outward from the opposed second side of the main lens component; wherein the position of the baffle is extendable from a position flush to the second side of the main lens component to a position extending outward from the second side of the main lens component in the direction of the emitted illumination.

Additional embodiments relating to luminaire assemblies include luminaires having a plurality of a space filling combinations of a light source and one or a plurality of augmented lens assembly are positioned adjacent to one another and oriented with respect to one another to completely tile a front surface of the luminaire with a space filling combination of the augmented lens assemblies without a gap; wherein the augmented lens assembly is selected from a geometrical shape selected from a circle, ellipse, triangle, rectangle, square, pentagon, hexagon, polygon, and combinations thereof; and any combinations of two or more geometrical shapes capable of completely tiling the front surface of the luminaire without a gap.

In a related embodiment, the first side and second side of the main lens component are substantially parallel to one another; while in another embodiment the first and second sides are non-parallel with respect to one another, for example, but not limited to instances where at least one side is curved, or alternatively both sides are curved with respect to one another.

In another related embodiment, the light refocusing element is selected from a lens having either a positive meniscus or a negative meniscus; wherein the meniscus of the lens is oriented with respect to the incoming light source so as to enable either the convergence or divergence of the incoming light, respectively.

In yet another embodiment, the light refocusing element is selected from a lens with a shape selected from cylindrical, concave, biconcave, plano-concave, convex, biconvex, plano-convex, aspheric, spherical, conical, frusto-conical, pyramidal, toric, sphero-cylindrical, and combinations thereof.

In yet a further embodiment, the light refocusing element is selected from a void space in the shape of a lens formed within or adjacent to either the first or second side of the lens element; and wherein the shape of the void space is selected from cylindrical, concave, biconcave, plano-concave, convex, biconvex, plano-convex, aspheric, spherical, conical, frusto-conical, pyramidal, toric, sphero-cylindrical, and combinations thereof.

In one embodiment, the light refocusing element is selected from an additive element, a subtractive element, or combination thereof, with respect to the material of composition of the lens element, or alternatively, the light refocusing element exhibits a refractive index that differs from that of the main lens material; wherein the additive element has an optical density that differs from the main lens material; and wherein the subtractive element has an optical density equivalent to air occupying a void space within the main lens material in the shape of the subtractive element.

In related embodiments, the plurality of refocusing elements is each positioned along one unique axis of rotation of the main lens component; wherein the main lens component has a geometrical shape selected from a circle, ellipse, triangle, rectangle, square, pentagon, hexagon, polygon, and combinations thereof.

In related embodiments, at least one of the pluralities of refocusing elements is positioned on or along an axis of rotation of the geometrical shape of the main lens component. In yet further related embodiments, the plurality of refocusing elements is positioned uniformly with respect to one another on at least one surface of the main lens, and with respect to their orientation, position and spacing.

One embodiment of the present disclosure includes a luminaire with improved lighting uniformity having a combination of at least one or a plurality of light sources with at least one or a plurality of augmented lens assemblies configured to receive light from the light source and positioned adjacent to the light source; optionally including a baffle element surrounding the augmented lens assembly; wherein the light source is selected from a point light source; wherein the augmented lens assembly has a main lens component having a first side and an opposed second side; wherein the first side is oriented to receive incoming light from a light source; wherein the opposed second side is oriented to transmit the incoming light; one or a plurality of refocusing elements associated with either the first side, the second side, or both sides of the main lens component; wherein the light refocusing element is positioned adjacent to either the first or second side of the main lens component; wherein the light refocusing element is selected from a lens having at least one curved surface; and wherein the light refocusing element is positioned along at least one axis of rotation of the main lens component.

In related embodiments, the baffle element is adjustable in position with respect to the opposed second side of the main lens component between a position flush with respect to the opposed second side and a position that is extended with respect to the opposed second side.

In yet further embodiments, the luminaire is composed of a combination of multiple shapes of individual lighting units in a space filling configuration to completely fill in or tile the illuminating front surface of the luminaire using combinations of the individual lighting units (each being a light source combined with an augmented lens assembly) which are positioned adjacent to one another to completely tile a front surface of the luminaire with the space filling combination of shaped lighting units present without a gap; wherein the augmented lens assembly is selected from a geometrical shape selected from a circle, ellipse, triangle, rectangle, square, pentagon, hexagon, polygon, and combinations thereof.

Another inventive embodiment of the present disclosure is a luminaire wherein the light source is a solid-state light source selected from an LED, LED array, Lambertian emitter, $2\pi$ emitter, and fiber optic light guide.

Yet another inventive embodiment of the present disclosure is a luminaire wherein the light source is a linear light source selected from an incandescent lamp, fluorescent tube, linear LED, linear LED array, linear Lambertian emitter, and linear fiber optic light guide.

In yet further embodiments, the light source is positioned adjacent to either a first side of the mains lens or adjacent to one or more sides or edges of the mains lens, or a combination thereof.

DETAILED DESCRIPTION

FIG. 1A shows a cross-sectional representation (100) of three embodiments (A, B, C) of lenses according to the present disclosure, each featuring various exemplary configurations of light refocusing elements, and with lenses also having optional baffles on one or more sides of the lens. In FIG. 1A, a flat main lens is illustrated without peripheral baffles (panel A), with flush baffles 121 (panel B) and alternatively with extended or protruding baffles 123 (panel C), as seen from a side-view perspective. In embodiment A, the main lens has a front or top surface 101 and an opposed rear or bottom surface 111 and features a first refocusing element 102 and a second refocusing element 104, both of which in this embodiment are convex shaped refocusing elements fixedly and optically coupled along one flat side to the front surface 101 of the main lens. Here, 102 and 104 are light refocusing elements that modify that front surface 101, both being positively (+) curved or convex lens features (e.g. having a positive meniscus with respect to an incident light source) with respect to the planar 101 surface that act to capture and redirect incident radiation, whether the augmented lens is illuminated by a light source from the side or below. For purposes of discussion, the illumination light source in the A embodiment is considered to be coming from the right side (or uncoated edge) of the main lens, while in the B and C embodiments, the illumination light source is considered to be coming from below, that is incident to the second or bottom surface of the illustrated lenses, so that radiation from a light source travels in an upward direction first entering surface 111 into the body of the main lens, and then exiting from surface 101 of the main lens, or alternatively coming from a side direction, so that radiation from the light source travels within the main lens through multiple internal reflections before exiting either the front (top) or back (bottom) surfaces. In one embodiment, the light refocusing elements 102 and 104 are convex (e.g., positive meniscus), serving to create a localized increase in illumination along a wavefront owing to their positive curvatures and negative focal point with respect to the 101 surface, thus accordingly acting as localized light focusing elements. In yet further alternative embodiments, improved light distribution occurs in embodiments in which the main lens material is at least partially light transmissive, being partially or fully transparent, or bears a surface with some dispersive coating, such as a frost, haze, grooved or otherwise patterned surface that further acts to disperse transmitted light.

In the second embodiment shown (B), refocusing elements 103 and 105 are present on the front surface of the main lens, 103 being a concave or negatively (−) curved element (e.g. with negative meniscus with respect to an incident light source) and 105 being a triangular (void) refocusing element, both of which tend to disperse light incident to them from a bottom or side light source via multiple internal reflections (and combinations thereof), and thus act to produce a localized change in illumination along a wavefront owing to their negative curvatures and internal redirection of light waves with respect to the lighting emitting front surface of the main lens 101. In this second embodiment B, two concave refocusing elements 103 and 105 are located on the top or distal surface of the main lens with respect to the incident light source (here being for example from the bottom). In one non-limiting embodiment, 103 and 105 may be formed according to the present disclosure from a similar or different material to provide them with a different index of refraction compared to the main lens, or alternatively be present in the form of void space. In a related embodiment, a fourth convex refocusing element (110) is located on the bottom surface of the main lens and can be formed using a similar or different material than that of the main lens as well.

Further, in this second embodiment (B), the main lens further features a peripheral baffle element (121), shown here in cross-sectional view, that otherwise surrounds the perimeter of the main lens, and which is approximately flush with respect to the upper surface of the main lens 101.

In the third embodiment shown (C) in FIG. 1A, a third convex refocusing element (106) and a seventh concave refocusing element (107) are present on the front surface of the main lens. In this particular embodiment, refocusing element 107 represents a void space in the main lens material in the shape of a concave depression, thus acting as a concave refocusing element owing to the curvature of the resulting surface and the differences in refractive index (optical density) between that of the material of the mains lens and essentially, air, being a void space. In a related embodiment, a sixth concave refocusing element 108 represents a concave refocusing element made of a different optical material than that of the mains lens material, having a difference in one or more optical properties including, but not limited to, refractive index, color, transparency, reflectivity, density, and other material properties. In a related embodiment, a fourth convex refocusing element (109) is located adjacent to the bottom (back) surface of the main lens, and present as a void space in the main lens material, but its orientation is inverted compared to refocusing element 107 with respect to the direction of incoming light rays from a light source located below the mains lens and thus incident to the bottom surface of the main lens. The combination of both positively (+) and negatively (−) curved elements enables additional control and tuning of the resulting propagated wavefront owing to the interaction of light transmitted upward through the main lens and then constructively and deconstructivity combining with light passing through the respective light refocusing elements to produce a more uniform reconstructed illumination field. In related embodiments, the relative size, including thickness, width or diameter, depth, or declination from surface of the light refocusing elements may be independently selected to manipulate the transmitted wavefront through the supportive main lens so as to enable the precise control of the illumination field. In yet further related embodiments, a void space in the shape as described herein as suitable for a refocusing element can also be employed as a refocusing element, owing to the difference in optical density between a mains lens material and the void space occupied by air. As shown in FIG. 1A panel C, the fourth convex refocusing elements (109) can be of different sizes and orientations in further related embodiments.

In further related embodiments, the light refocusing elements may be made of the same material as the main lens, or alternatively of a different optical material, or yet alternatively as a void space in the main lens material. In embodiments wherein the light refocusing elements are convex or positively curved elements, they may be made of the same material as the main lens, or co-fabricated with the main lens at the time of its production, to produce the disclosed features, geometry and characteristics of the novel refocusing elements as disclosed herein. In further embodiments wherein the light refocusing elements are concave or negatively curved elements, they may be formed one or a plurality of void spaces in the main lens material at its surface 101, thus being in the form of a lens-shaped divot or shallow region featuring the absence of optical material, yet continuing to exhibit the characteristic properties of auxiliary lenses owing to their placement at or near the front surface of the main lens 101. Yet, in other embodiments, the light refocusing elements (both negative and positive refocusing elements) may be constructed of a different optical material than the main lens, and placed into position as shown, optionally employing some binding means such as, but not limited to an adhesive, bonding agent, cement, glue and the like; or some attachment means including but not limited to employing a laser, heat impulse, thermal or ultrasonic bonding, and the like; or yet alternatively some friction or snap fitting means achieved by some receptive coupling features incorporated into the main lens, auxiliary lenses or both.

The third embodiment (C) shown in FIG. 1A also feature an optional peripheral baffle (123) that extends above the front surface of the mains lens. The advantages and characteristics of these optional baffle elements to augment the illumination characteristics of the novel lenses disclosed herein are further shown and described in relation to FIG. 9 discussed below.

The first embodiment (A) shown in FIG. 1A also features optional reflective elements present either on the side (117) or surface (119) of the main lens's back surface 113 to prevent the escape or emission of light from those surfaces and to redirect light by means of improved internal reflection back into the main lens portion for emission from the front surface 101 and the light refocusing elements present.

Reflective coatings are particularly advantageous on edge-lit lens embodiments employing light guide plates, for example, as they increase the amount of internally reflected light back into the main lens, reducing the unwanted transmission of light from the back and side edges of the lens, and thereby increasing the amount of light transmitted from the front surface of the lens or plate. Embodiments shown in panel A of FIG. 1A are representative of a cross-sectional side view of a main lens or segment of main lens featuring one or a plurality of light refocusing elements, here being plano-convex and plano-concave shaped lens elements and combinations thereof.

FIG. 1B shows cross-sectional representations of edge-lighted internally reflective main lens components (light guide plates), the top panel A showing a traditional internally reflective lens element 140 common to the art, and the lower panel B showing one embodiment of the present disclosure featuring an internally reflective lens element with at least one light refocusing element 107 present. In these examples, an external LED provides for edge injected LED illumination 130 of the main lens component, the illustrative bundle of internally reflective light rays (147, 157) representing the path of direct and internally reflected right as transmitted within the body of the optical lens material 142 and 152, respectively. These rays are typically internally reflected a multiple number of times between the front, back and side internal surfaces of the main lens component before being emitted from the front surface to affect the desired illumination. Internally reflective treatments, such as for example but not limited to a coating, layer, film, or surface treatment that has a high degree of reflectivity may optionally be added to one or more outside surfaces and edges (sides) of the main lens component to improve the degree of internal reflection serving to increase the amount of light emitted from the front surface.

In the embodiment shown in panel B of FIG. 1B, the main lens or light guide plate 150 has a front surface 156 featuring one exemplary light refocusing elements 107, while the side and back surfaces of the optical lens material are coated with an edge (side) reflective element 155 and back reflective element 154, respectively. In contrast to the conventional example A, the addition of the light refocusing element 107 results in the interaction through reflection, refraction and scattering with the plurality of internally reflected light rays 157 to produce a unique pattern of auxiliary emitted light rays 159, which combine with light emitted from the front transmissive surface 156 to produce a unique illumination field that differs substantially from that emitted from the transmissive surface 146 of lens 140 representative of an unmodified, common art light guide plate (panel A).

In further related embodiments, a flat lens or light guide plate may have one or a plurality of light refocusing lens features, the same or different, and located at any desired position or orientation to achieve a desired lighting effect. Additional exemplary embodiments are shown in FIG. 1C for a flat lens or light guide plate made of optical lens material 152 with a variety of light refocusing elements located on the front transmissive surface 156 of the main lens. In some embodiments, the lenses disclosed herein include reflective elements 144 to improve internal transmission of light. In the embodiment shown in FIG. 1C, an LED provides for edge injected illumination 130, creating three exemplary bundles of internal light rays, 162, 164 and 166 that interact with light refocusing elements 161, 163 and 165, respectively, to produce an augmented light field illustrated by the auxiliary emitted light rays 173, 171 and 159, respectively. Light refocusing element 161 has a right triangular shape or right triangular cross-sectional shape, while light refocusing element 163 has a triangular shape or triangular cross-sectional shape, and light refocusing element 165 has a dot-shape or circular cross-sectional shape. Each of the exemplary light refocusing elements will act to refract, reflect, and redirect both direct and internally reflected light in a unique way as a result of its position, shape, size, orientation, and refractive index with respect to the optical lens material and the position and orientation of the incoming illumination.

While the embodiments in FIG. 1C are shown in cross-sectional view in the upper panel, the lower panel shows several additional embodiments of light refocusing elements as seen from above and configured in a selection of different shapes and patterns, including those selected from a small chevron 180, large chevron 181, an arc 182, sinusoidal 183, linear and/or dot 184, triangular 185 and square and/or rectangular 186. Additional shapes, patterns and combinations of the shapes, sizes, orientation, and combinations as disclosed herein, and similarly non-disclosed common geometric styles and patterns are included with these embodiments as suitable for use in the present disclosure as light refocusing elements. Some non-limiting examples include shapes such as a cone, cylinder, tetrahedron, pyramid, cube, cuboid, polyhedron, prism, rectangular cuboid, rectangular parallelepiped, spheroid, and the like having a three-dimensional aspect with respect to the surface plane of a main lens.

In addition to the edge or side illuminated lens system embodiments described above, the present disclosure also includes embodiments of back-illuminated lens systems in which the source of light is positioned behind the rear or back surface of the mains lens element so that light propagates through the lens for emission from the front surface, as modified by the presence of one or a plurality of light refocusing elements present on either one or both surfaces of the modified main lens component.

FIG. 2 is a cross-sectional comparison of luminaires (200) with one exemplary embodiment (B) both featuring a main lens component 206 and light refocusing elements, a first 208 and second 210, illustrated so as to show the light refocusing element's ability to modify the propagation patterns of emitted light. In panel A, a typical main lens 206 is oriented around a center illumination axis 201 that passes through an LED component 202 that emits light through a concentric LED lens 204 that is located a fixed distance from a rear or back surface 211 of the main lens component 206. In this example, the LED component 202 emits a fairly regular spherical (or Lambertian) illumination field, resulting in a series of spherical illumination wavefronts illustrated by 203', 203" and 203''' at different radiuses from the point source of light emitted by the LED lens 204 at the intersection of the planar axis 205 and the center illumination axis 201. These wavefronts impinge on the lens element 206 and propagate by transmission through the bulk of 204 to produce a spherical illumination wavefront essentially corresponding to 203''', owing to 206 being a flat lens with parallel optical sides, ignoring any internal reflection so that the resultant rays (not shown, but illustrated by the upper and lower light ray illumination boundary 207) pass through and exit the front surface 219 of 206 with minimum distortion. This illumination wavefront 203''' thus produces a resultant (overall combined) illumination wavefront 209 at some comparative distance from the planar axis 205.

In contrast, embodiment B illustrates a refocusing lens element according to the present disclosure with a modified and improved resultant illumination wavefront 217 located at the same comparative distance from the planar axis 205.

In this embodiment, the LED component and LED lens generates similar successive illumination wavefronts 203', 203" and 203'" that impinge on the rear or back surface 211 of the mains lens component 206. However, in contrast to the flat planar lens in panel A, the successive 203 wavefronts enter 206 and interact with the first and second refocusing elements 208 and 210, which are both concave or negatively curved with respect to the propagation direction of the illumination wavefront, thus each producing a defocused or dispersed illumination wavefront 211 and 211', respectively, at a first distance; and then the illumination wavefront 213 and 213', respectively, at a second distance from the defocusing element's focal point. These defocused illumination wavefronts then interact with the main lens contributory wavefront 215' to produce a resultant illumination wavefront 217 at a comparative distance from 205 to enable the change in the illumination pattern to be more readily visualized. In this particular embodiment (B), the light refocusing elements associated with the main lens component 206 result in a slight reduction in transmitted light intensity about the center illumination axis 201 with a concomitant increase in transmitted light intensity near the top and bottom illumination boundary 207, resulting in an overall resultant flattening or smoothing in the illumination wavefront emitted as seen by comparing example A's illumination wavefront 209 with that of the exemplary embodiment B's resultant illumination wavefront 217. It is to be noted that the traces presented in FIG. 1 are exaggerated somewhat for the purpose of illustration only.

FIG. 3 is a top-view illustration (300) of three embodiments (A, B, C) of circular or discoid shaped lenses with various exemplary configurations of light refocusing elements. In panel A, an augmented lens according to the present disclosure features a single refocusing element 302 that is located at the intersection of a horizontal reference axis 301 and a vertical reference axis 305. In this embodiment, the light refocusing element 302 may be either a substantially convex or concave refocusing element and may be located on either a front or back surface of the circular shaped main lens component. Accordingly, depending on the location (on a front propagation surface or on the opposed transmissive surface of the main lens) and polarity (positive or negative curvature) of the light refocusing element, it may act to either locally focus or disperse an impinging wavefront as the main lens is illuminated from a selected side.

In a second embodiment shown in panel B, the main lens features a plurality of radial (off center) light refocusing elements 304 that are located coincident to at least one of the vertical or horizontal reference axis, although this is not a limitation in other similar embodiments. In a third embodiment shown in panel C, the main lens features a center refocusing element 302 and a plurality of radial refocusing elements 304. In these various embodiments A, B and C, the light refocusing elements may be selected from a positively curved, negatively curved or combination of refocusing lens-shaped features as disclosed herein.

In further embodiments, the number and relative position of the off center or radial refocusing elements may differ and may be selected to achieve a desired resultant optical pattern or illumination wavefront. Accordingly, in further embodiments, a modified mains lens with light refocusing elements may feature any number of refocusing elements arranged anywhere adjacent to a first or second surface of the mains lens, or in a further embodiment imbedded within the main lens as an additive component lens or present as a void space with the main lens.

While not shown, the light refocusing elements are not constrained to round, circular or spherical-shaped elements additive to the main lens or conversely negative void spaces formed in the main lens, but may also be of different shapes and more complex lens geometries, including but not limited to rectangular, prismatic, elliptical, Fresnel, rhomboid, polygonal or aspheric patterns and shapes, and combinations thereof, and combinations of such. Further, the light refocusing elements lens may be used to correct for astigmatism and other optical aberrations in the emitted or transmitted illumination wavefronts produced by the main lens itself or produced in combination with any single refocusing element or a plurality of refocusing elements acting in tandem.

Figure 4:
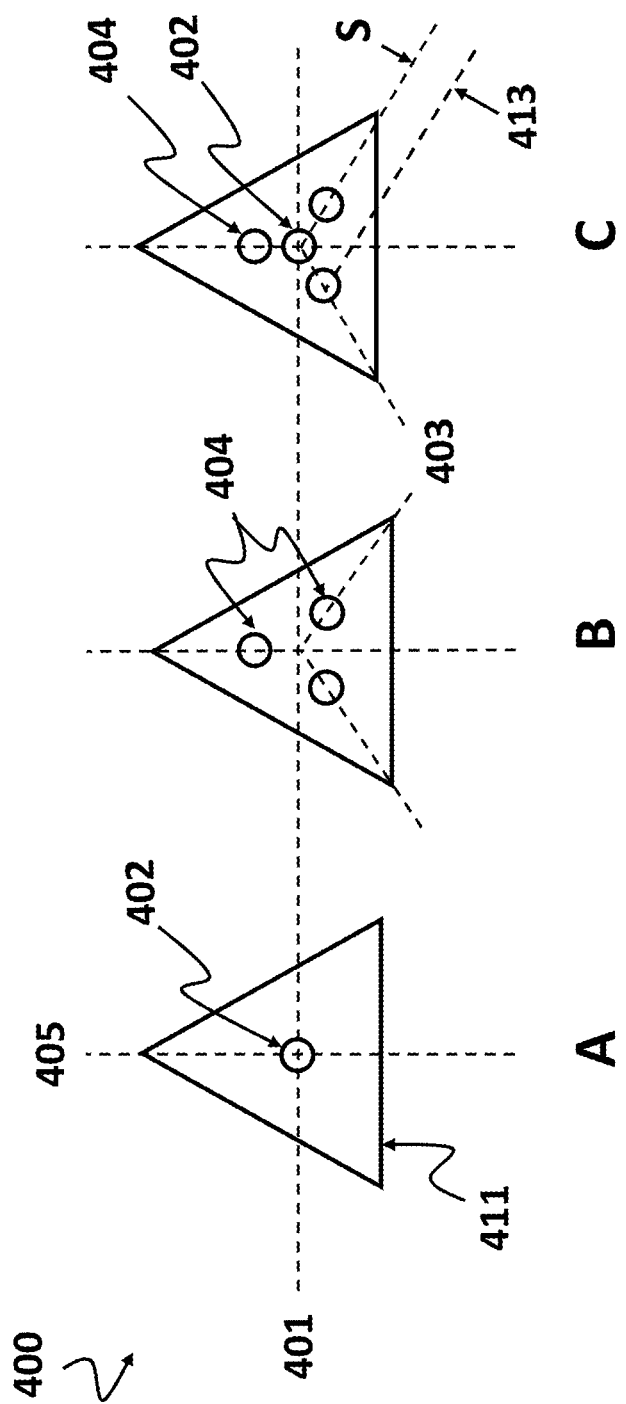
FIG. 4 is a top-view illustration of three embodiments (A, B, C) of triangular lenses with various exemplary configurations of light refocusing elements.

FIG. 4 is a top-view illustration (400) of three embodiments (A, B, C) of triangular shaped lenses with various exemplary configurations of light refocusing elements. In panel A, an augmented lens according to the present disclosure features a single refocusing element 402 that is located at the intersection of a horizontal reference axis 401 and a vertical reference axis 405. In this embodiment, the light refocusing element 402 may be either a substantially convex or concave refocusing element and may be located on either a front or back surface of the triangular shaped main lens component. Accordingly, depending on the location (on a front propagation surface or on the opposed transmissive surface of the main lens) and polarity (positive or negative curvature) of the light refocusing element, it may act to either locally focus or disperse an impinging wavefront as the main lens is illuminated from a selected side.

In a second embodiment shown in panel B, the main lens features a plurality of radial (off center) refocusing elements 404 that are located coincident to at least one of the vertical or horizontal reference axis, although this is not a limitation in other similar embodiments. In a third embodiment shown in panel C, the main lens features a center refocusing element 402 and a plurality of radial refocusing elements 404. In these various embodiments A, B and C, the light refocusing elements may be selected from a positively curved, negatively curved or combination of refocusing lens-shaped features as disclosed herein.

In embodiments B and C, the radial refocusing elements are arranged coincident to the apex axis 403, which also corresponds in this example to the vertical reference axis 405 owing to the rotational symmetry of an equilateral triangle about its center axis intersection at 401 and 405 (as well as its rotational symmetry about any one of the apex axis 403 in this particular case).

Further, the interspacing between an optional center refocusing element and any one or plurality of radial (off-center) refocusing elements, or between each radial refocusing element may be selected as needed to produce a desired optical effect. In exemplary embodiment C, the distance 413 shows the relative interspacing (S) between the center and radial refocusing elements. In other embodiments (not shown) the interspacing S and spacing S' (not shown) between the radial refocusing elements may vary as needed.

FIG. 5 is a top-view illustration (500) of three embodiments (A, B, C) of rectangular (square) shaped lenses with various exemplary configurations of light refocusing elements. In panel A, an augmented lens according to the present disclosure features a single refocusing element 502 that is located at the intersection of a horizontal reference axis 501 and a vertical reference axis 505. In this embodiment, the light refocusing element 502 may be either a substantially convex or concave refocusing element and may be located on either a front or back surface of the rectangular shaped main lens component. Accordingly, depending on the location (on a front propagation surface or on the opposed transmissive surface of the main lens) and polarity (positive or negative curvature) of the light refocusing element, it may act to either locally focus or disperse an impinging wavefront as the main lens is illuminated from a selected side.

In a second embodiment shown in panel B, the main lens features a plurality of radial (off center) refocusing elements 504 that are located coincident to at least one of the apex axes 503, although this is not a limitation in other similar embodiments. For example, in a closely related embodiment, the plurality of radial refocusing elements 504 could be located along the combination of the horizontal reference axis 501 and the vertical reference axis 505, while in yet another embodiment, one or more radial refocusing elements arranged coincident to each one of the four axes, 501, 505 and the two 503 apex axes. In a third embodiment shown in panel C, the main lens features a center refocusing element 502 and a plurality of radial refocusing elements 504. In these various embodiments A, B and C, the light refocusing elements may be selected from a positively curved, negatively curved or combination of refocusing lens-shaped features as disclosed herein. Further, the number and relative separation between an optional center refocusing element 502 and axial refocusing elements 504 may be selected as desired to achieve a particular optical effect.

Figure 6A:
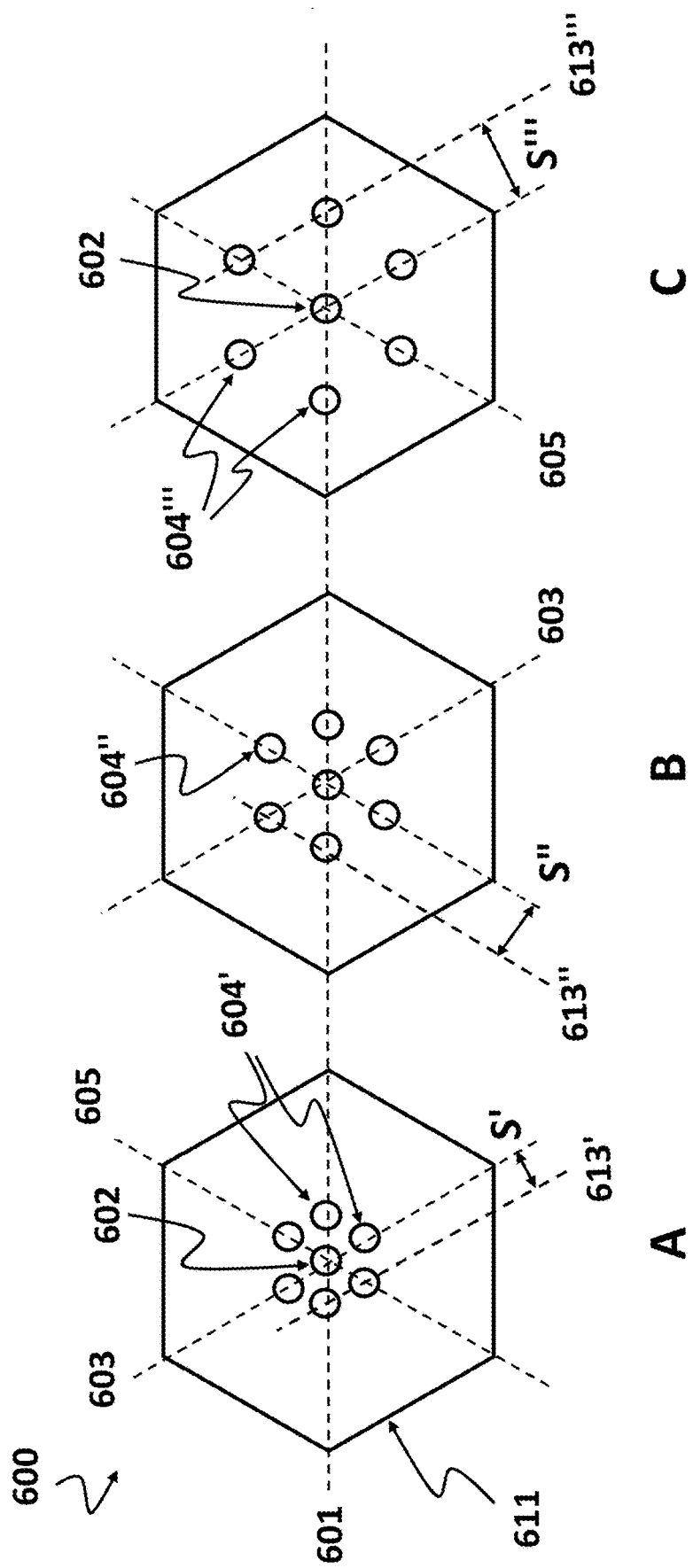
FIG. 6A is a top-view illustration of three embodiments (A, B, C) of polygonal (hexagonal) lenses with various exemplary configurations of light refocusing elements.

FIG. 6A is a top-view illustration (600) of three embodiments (A, B, C) of polygonal (hexagonal) lenses with various exemplary configurations of light refocusing elements. In a first embodiment (A), a hexagonal lens 611 features a plurality of refocusing elements including an axial or center refocusing element 602 and six radial (off center) refocusing elements located coincident to each of the major axis, including the horizontal reference axis 601, a first apex axis 603 and second apex axis 605. In this embodiment, the average spacing (S') or distance between the center and radial refocusing elements is denoted by 613'. In the second embodiment (B), the main lens component also features a plurality of radial refocusing elements, but which are spaced at a greater distance (S") from each other as denoted by 613". In yet a further embodiment according to the present disclosure, a main lens featuring more widely spaced refocusing elements separated by a distance (S''') as denoted by 613'''. In closely related embodiments, the center refocusing element is optional, or alternatively if included the number of radial refocusing elements can be any integral number, if present. Further, in alternative embodiments, the spacing between any first and second of a plurality of radial refocusing elements can vary from each other or each set of refocusing elements as desired to achieve a particular illumination pattern. In further related embodiments, radial refocusing elements may be located at any position within the perimeter of main lens component. In yet further embodiments, the number and position of any radial or off-center refocusing elements can be any integer number, and they may be spaced relative to one another at any desired position to achieve a particular optical effect. In further embodiments, the nature of each individual refocusing element may be selected independently from another, for example, a combination of positive (convex) and negative (concave) refocusing elements. In yet further related embodiments, the position of each individual refocusing element with respect to the main lens surface may vary, with one or more refocusing elements positioned on or adjacent to a front (or first) surface of the main lens, or alternatively, with one or more refocusing elements position on or adjacent to a back (or opposed, second) surface of the main lens, with the incident light source, unless otherwise stated, typically being located behind the back surface of the main lens, so that emitted light first strikes the back surface and then propagates through the lens and exits or is transmitted from the front surface to provide light to an illumination plane located at a farther distance from the front surface of the main lens.

FIG. 6B shows additional embodiments of the disclosure featuring examples of edge illuminated main lenses featuring a variety of light refocusing elements. In panel A, one hexagonal main lens features a pair of semi-circular light refocusing elements 680 approximately oriented and positioned about axis 601, while a second main lens features a single light refocusing element 681 or different size also positioned about axis 601, in combination with a center light refocusing element 685 positioned at the intersection of axes 601, 603 and 605. In related embodiments (not shown), the orientation of the light refocusing elements may be selected to align with another axis, such as for example an axis normal to at least one edge of the main lens, opposed to the position of the side injected light source, such as an LED located on the opposing side. In the embodiments shown in FIG. 6B, panel A, the source of illumination may differ between the two main lenses shown, for example the left most lens being side-illuminated, while the right most lens is back illuminated by a light source position normal to the center axis corresponding to the intersection of axes 601, 603 and 604, so that the light refocusing element 685 is coincident with the source illumination. In further related embodiments, adjacent main lenses in a collection of a plurality of lenses may have the same or different pattern of light refocusing elements or feature them in different positions and/or orientations.

In panel B of FIG. 6B, the left most main lens features two light refocusing elements, one chevron shaped (682) and one diamond or square shaped (683), both located off center from a central axis. The right most lens features a plurality of light refocusing elements in the shape of semi-circles, being present either as an additive feature (680) or as a subtractive feature (684) on the main lens surface. In further related embodiments, a combination of additive and subtractive light refocusing elements may be combined to achieve a desired lighting effect. In yet further related embodiments, a combination of additive and/or subtractive light refocusing elements may be positioned and oriented in any direction across one or more surfaces of the main lens to achieve a desired lighting effect.

With commercially available ray-tracing software well known in the art, the optical transmission properties of a main lens with any number, position and type of refocusing elements present may be employed to select and determine the number, position and type of refocusing elements needed to achieve a particular optical effect including adjusting the resultant illumination wavefront to produce more uniform lighting across an illumination field, or other desired optical effects.

While the above embodiments were described with respect to individual main lens components featuring light refocusing elements present to adjust and modify the optical properties of the individual lens, a further aspect of the present disclosure is to combine a plurality of modified lens components in a luminaire lighting system where a larger illumination field is desired, such as to illuminate a desk or room, or for use in wall or ceiling lighting panels or in an array of lighting components to illuminate a desired surface.

FIG. 7 is a front-view illustration of a luminaire panel (700) with a plurality of differently shaped lighting components in a space-filling propagation pattern. In this illustration, a plane bounded by a vertical edge 701 and a horizontal edge 705 is to be filled with a close-packed array of a plurality of exemplary hexagonal lens components 713 featuring hexagonal lens elements (711) with a cluster of a plurality of refocusing elements (702) located around the center optical axis of each lens element, the center axis corresponding to a center refocusing element (not labelled) amongst the cluster 702. It is noted that the hexagonal lens components 713 fit together well in tiling the bulk of the available planar area bounded by 701 and 705, dotted lines denoting yet to be tiled spaces representing continued propagation pattern 723 of the hexagonal lens components 713. However, along the vertical 701 and horizontal 705 edges of the luminaire, gaps exist that cannot be tiled with the same hexagonal lens component 713 as the available open spaces are smaller and have different geometrical shapes. The pattern of repeated hexagonal lens components represents one embodiment of the present disclosure, tiled as shown. Accordingly, in a further embodiment, additional lens components, optionally featuring one or more of the lights refocusing elements associated therewith, may then be added to open spaces in the luminaire panel (700) to complete the tiling. In one embodiment, a right-angle triangular lens component 740 can be positioned at the open triangular location corresponding to lens opening 741. In this embodiment, owing to the smaller size of the right-angle triangular lens element 740, the lens element 740 does not require a light refocusing element for improved illumination uniformity. In a second embodiment, a triangular lens component 750 bearing a single, approximately centered refocusing element 752, can be positioned at the open triangular location corresponding to lens opening 751. In a third embodiment, a trapezoidal lens component 730 bearing a plurality of three refocusing elements 732 arranged in an approximately centric linear pattern, can be positioned at the open trapezoidal location corresponding to lens opening 731. In a fourth embodiment combining all four types of lens components 713, 730, 740 and 750 employed in the indicated pattern, the plane area of the luminaire panel (700) may be completely tiled with lens sections according to the present disclosure to create an improved luminaire with more uniform lighting characteristics and other optical advantages as disclosed herein.

In the embodiments shown in FIG. 7, the individual main lens components may be backlit by a common light source, or alternatively backlit by its own light source, or yet alternatively lit by means of an edge positioned LED present on at least one edge of the main lens component.

In related embodiments (not shown), a luminaire panel may be fabricated with a plurality of a combination of individual lens components according to the present disclosure, to produce a lighting array without any significant gaps between the individual lens components (or alternatively individual lighting components with a light source and associated lens component). Further, one or a plurality of the individual lens components may feature light refocusing elements, if needed for that particular individual lens component or if needed to compensate for an edge lighting deficiency.

Figure 8:
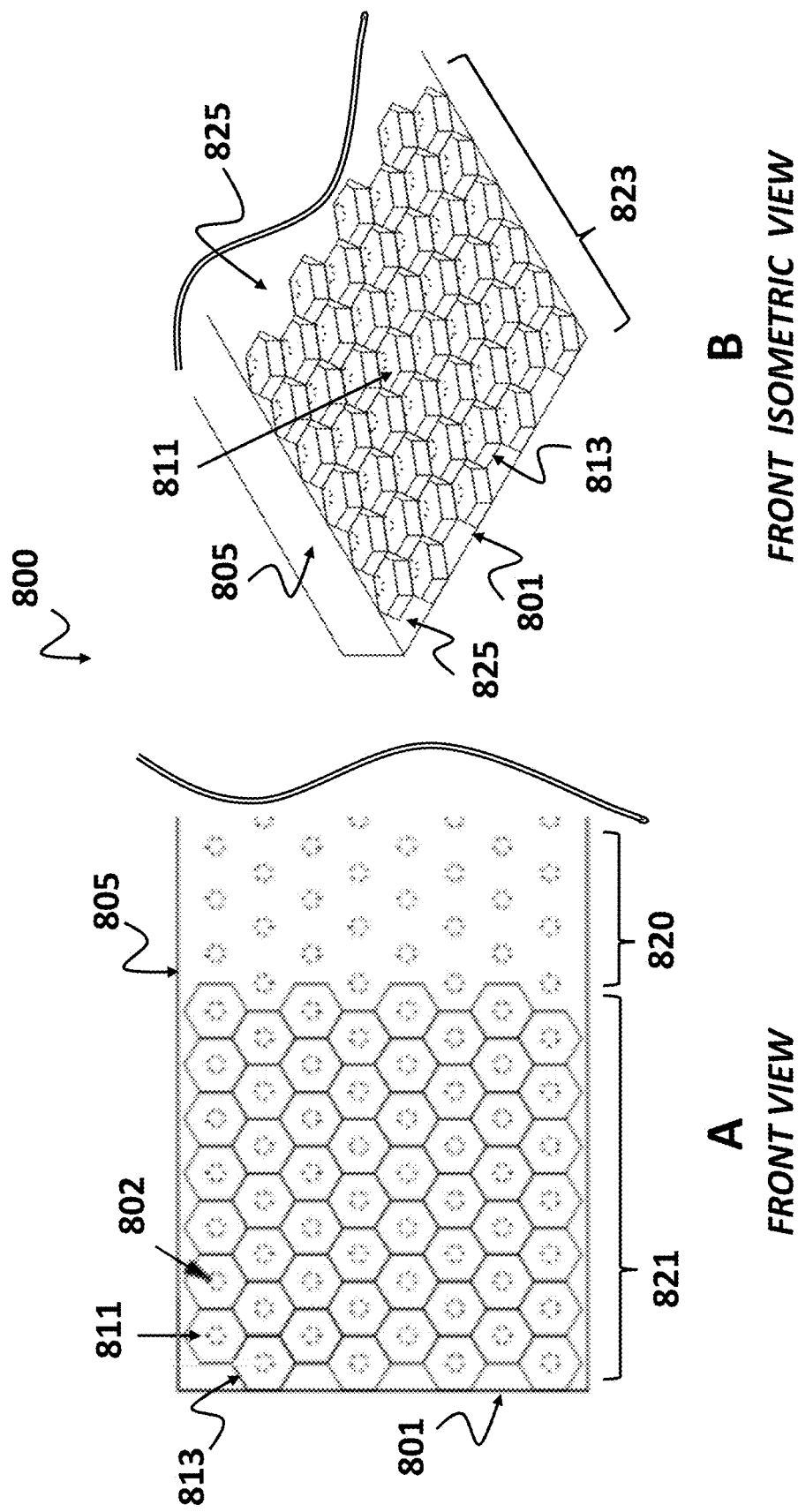
FIG. 8 is a front-view (A) and front-perspective view (B) of a luminaire panel with a plurality of repeated hexagonal shaped lighting components with refocusing elements.

In alternative embodiments, a luminaire panel may be fabricated with a plurality of identical individual lens components according to the present disclosure to produce a lighting array with minimal gaps between the individual lens components or individual lighting components. FIG. 8 is an illustration of a luminaire panel 800 showing a front-view (A) and front-isometric (perspective) view (B) of the luminaire panel featuring a plurality of repeated hexagonal lens components 813, being hexagonal lens elements (811), each featuring a plurality of light refocusing elements 802. In the embodiment shown, the hexagonal lens components 813 are arranged with one vertical axis arranged parallel to the vertical edge and side 801 of the luminaire panel 800, with the apexes of the individual hexagonal lens components 813 arranged along the horizontal edge and side 805 touching or in close proximity to that side 805.

In the front isometric view shown in panel B of FIG. 8, the luminaire panel 800 is seen to feature a plurality of recessed hexagonal lens components (813) each located within a plurality of deep recessed baffles 823 that are located adjacent to the front surface 825 of the luminaire, all bounded by the edges of the luminaire panel 800 represented by the vertical edge and side 801 and the horizontal edge and side 805. In the embodiments shown in FIG. 8, the tiling pattern is indicated as a continuing repeated pattern (not labeled) that can extend to any desired length, and not including any space-filling edge lens components or lighting components to complete the tiling of the luminaire panel 800.

In related embodiments, the baffles may take the form of a recessed area with one or more sidewalls in which the augmented lens assemblies are positioned, so that the surface of the mains lens component is either adjacent to (flush) or recessed (depressed) with respect to the illumination surface of the luminaire. In these embodiments, the sidewall act as baffles and can be similarly constructed of a material selected from light-transmissive, non-light transmissive, opaque, semi-opaque, refractive, and reflective material, and combinations thereof.

In further related embodiments of the present disclosure, a luminaire panel may be constructed bearing a plurality of geometric shaped lens components or lighting components, selected from any desired geometric shape including but not limited to circular, triangular, rectangular, rhomboidal, square, elliptical, trapezoidal, polygonal and the like, and combinations thereof, and other space filling tiled-shapes such as a Penrose polygonal tile set. In related embodiments, the lenses or lighting components (lighting unit with light source and lens) may feature one or a plurality of light refocusing elements located on the main lens component or on the main lens within a lighting component. In yet further related embodiments, combinations of two or more geometric shaped lens components of lighting components may be used to fill-in or tile the available space within a luminaire panel to produce a substantially gapless or filled plane that further serves to produce a uniform illumination plane as a result of the combined light emissions from each of the lens or lighting components, wherein any one or number of the individual main lens components may feature one or a plurality of light refocusing elements.

In related embodiments, baffles may be employed to surround an individual lens or lighting component to produce some light shielding effect, or in alternative embodiments, multiple baffles may be employed to surround an array of individual lens or lighting components. The shape, geometry and depth of the baffles may be selected as desired. In closely related embodiments, a recessed lens or lighting component may be employed wherein the side walls of the lighting fixture function as baffles, such as in a recessed lighting unit. In further related embodiments, a luminaire panel may be constructed with one or a plurality of recessed lenses or lighting components, the walls of the recessed areas accommodating the recessed lighting elements acting as baffles to control the pattern of illumination produced by the array of lighting elements within the luminaire. The use of extended baffles or recessed lighting elements further augments the ability of the disclosed main lens components with light refocusing elements to control the pattern, uniformity and intensity of the resulting combined wavefront and illumination plane generated by the inventive lighting elements as disclosed herein in various embodiments. The use of extended baffles or recessed lighting elements further serves to modify the appearance of the luminaire panels both when illuminated and when power-down and non-illuminated.

Figure 9:
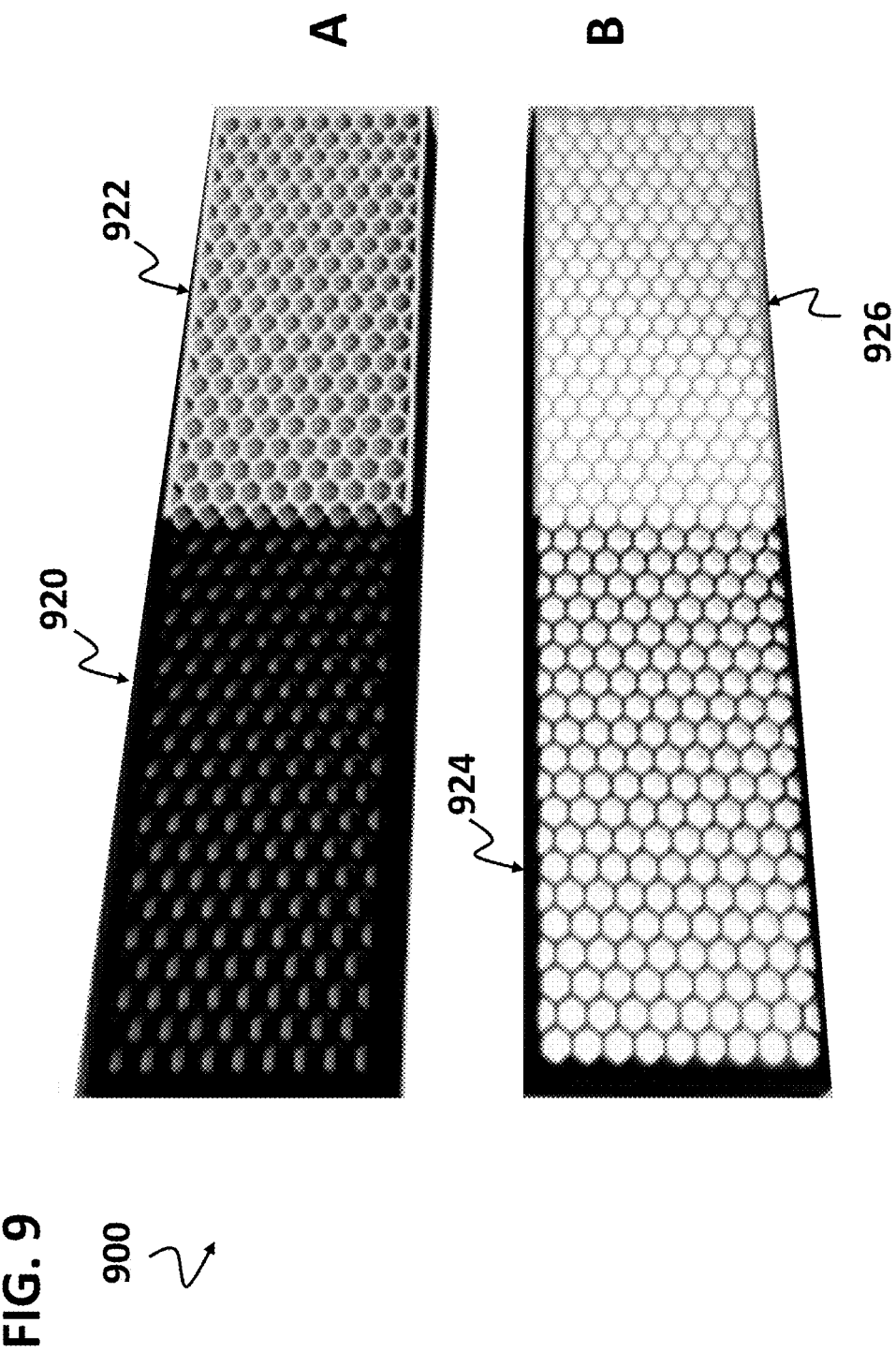
FIG. 9 is a front-view of exemplary luminaires with deep light baffles (A) and shallow light baffles (B) shown in an illuminated state and non-illuminated state.

FIG. 9 is a front-view of exemplary luminaires (900) according to the present disclosure with deep light baffles (A) and shallow light baffles (B) shown in an illuminated state 922 and 926 respectively, and shown in a non-illuminated state, 920 and 924, respectively. Here, the upper luminaire with deep light baffles (A) offers the advantage, when dark-shaded baffles are employed, of appearing essentially featureless and dark when the luminaire's lighting elements are not illuminated, providing an alternative aesthetic to light colored or reflective baffles that are used to improve light dispersion. By means of employing a plurality of the inventive lenses and lighting components featuring one or more lenses with light refocusing elements, uniform illumination can be provided when the luminaire is in an illuminated state 920, yet visually deemphasizing the luminaire when in its non-illuminated state 922. The depth, shape and pattern of the baffles may be modified in alternative embodiments, including the use of a shallower baffle as shown in panel B. Here, when the luminaire is in a non-illuminated state 924, the appearance of the luminaire is not as dark as in the prior embodiment A, providing a different aesthetic to the lighting system. When the luminaire in panel B is in an illuminated state 926, the baffles are highly deemphasized in appearance and the luminaire provides yet another different aesthetic to an observer. Accordingly, the selection of baffles, their color, shape, size, and position, may be employed to change the overall appearance of an individual lighting component or plurality of lighting elements or lighting components within a luminaire to achieve a desired aesthetic compared to conventional luminaires not employing baffles. The selection of the material of which the baffle is constructed may also be used to modify the overall illumination. In related embodiments, the baffle may be a material selected from a light-transmissive, non-light transmissive, opaque, semi-opaque, refractive, and reflective material, and combinations thereof;

In other embodiments, the baffles may be adjustable in position, from a position in which the outer edge of the baffle is flush or coincident to the illumination (second) surface of the lighting unit or of the main lens, to an extended position in which the outer edge of the baffle extends beyond the surface of the luminaire or assembled lighting units on the surface of the luminaire assembly.

In further related embodiments, individual or a plurality of recessed housing elements can be employed instead of baffles to produce an identical or essentially equivalent effect, the recessed side walls of the housing elements acting as baffles to modify the appearance of the lighting component or luminaire when in either an illuminated or non-illuminated state, to achieve the desired aesthetic. One non-limiting example is the use of deep baffles or deep recessed housing elements to deemphasize the appearance of non-illuminated luminaires so that they are not visually notable by the eyes of a typical observer, i.e., they tend to fade into the background when not in use. In a further embodiment, the baffles may be constructed so as to be moveable in depth and orientation, so that the degree of recession and the angle of view are adjustable by the user in order to optimize the provided illumination as desired.

While a variety of individual embodiments have been described in the present disclosure, the invention further contemplates obvious variations and combinations of the specific embodiments not necessarily included herein.

Refocusing Elements

Simple lenses are suitable for use in one or more of the embodiments of the present disclosure when used as refocusing elements in association with a main lens to augment the main lens light transmission and propagation characteristics to produce a more uniform illumination plane. Simple lenses are classified by the curvature of the two optical surfaces. A lens is biconvex (or double convex, or just convex) if both surfaces are convex. If both surfaces have the same radius of curvature, the lens is equiconvex. A lens with two concave surfaces is biconcave (or just concave). If one of the surfaces is flat, the lens is plano-convex or plano-concave depending on the curvature of the other surface. A lens with one convex and one concave side is convex-concave or meniscus. If the lens is biconvex or plano-convex, a collimated beam of light passing through the lens converges to a spot (a focus) behind the lens. In this case, the lens is called a positive or converging lens. For a thin lens in air, the distance from the lens to the spot is the focal length of the lens, which is commonly represented by "f" in diagrams and equations. An extended hemispherical lens is a special type of plano-convex lens, in which the lens's curved surface is a full hemisphere and the lens is much thicker than the radius of curvature. Most simple lenses are spherical lenses: their two surfaces are parts of the surfaces of spheres. Each surface can be convex (bulging outwards from the lens), concave (depressed into the lens), or planar (flat). Convex-concave (meniscus) lenses can be either positive or negative, depending on the relative curvatures of the two surfaces. A negative meniscus lens has a steeper concave surface and is thinner at the center than at the periphery. Conversely, a positive meniscus lens has a steeper convex surface and is thicker at the center than at the periphery. A particularly thin lens with two surfaces of equal curvature would have zero optical power, meaning that it would neither converge nor diverge light. All real lenses have nonzero thickness, however, which makes a real lens with identical curved surfaces slightly positive.

The light bending behavior of a lens also depends on the position of the light source providing either a source of parallel light rays or if a point light source, a source of diverging light rays.

In other embodiments, more complex shaped light refocusing lenses can be used, or conversely void spaces in the shapes of such more complex lenses. Some non-limiting examples of more complex lens shapes include circular, cylindrical, concave, biconcave, plano-concave, convex, biconvex, plano-convex, aspheric, spherical, conical, frusto-conical, pyramidal, toric, sphero-cylindrical, and combinations thereof.

When a light source and a first refocusing element are arranged so that the incident light is then dispersed over a larger area, the light refocusing element is described and functions as a "de-focusing" element, while in contrast, when either the combination of light source and first refocusing element are arranged oppositely, either from a change in the relative orientation of that first refocusing element with respect to the light source or a second different refocusing element is employed so as to result in the incident light being concentrated within a smaller area, the light refocusing element is described and functions as a "focusing" element. Accordingly, the term "refocusing element" broadly includes lens used as elements to subsequently either defocus or focus incident light impinging upon them, depending on the nature of the light source (parallel, diverging or converging light rays), the position of the light source relative to a first incident surface of the light refocusing element and its position and orientation with respect to the main lens with which it is associated, the nature of the light refocusing element as having either a positive or negative meniscus with respect to its principle focal point, and finally the relative orientation of the light refocusing element's principle axis with respect to the illumination axis of the incident light source.

In other embodiments, the light refocusing elements may take the form of additive or subtractive feature in any suitable shape as desired to achieve a particular lighting effect, including shapes such as circular, rectangular, prismatic, elliptical, Fresnel, rhomboid, polygonal, triangular or aspheric patterns and shapes, or yet alternatively in shapes resembling chevrons, arcs, semi-circles, sinusoidal shapes, linear cylindrical shapes, dots, triangular, square and/or rectangular shapes with respect to at least on cross-section of the light refocusing elements. Various combinations of shapes may be combined, as well as combinations of negative, positive, scattering, and void features having optical properties differing from the main lens material so as to achieve an optical effect compared to a plain or unmodified lens.

In embodiments employing edge illumination, the light refocusing elements may be selected as well for their ability to scatter and redirect internally reflected light, as well as to interact and redirect internally reflected light outward from the main lens to modify the subsequent illumination pattern as desired.

Further, in embodiments with a plurality of light refocusing elements, the overall light transmission properties of the array can be selectively adjusted, by means of combining one or more of the light refocusing elements selected from one or more types of lens types, to produce in an overall light focusing, defocusing, unfocusing or scattering effect with respect to the original incident light source.

Process & Materials

Any suitable materials can be used and employed to construct and fabricate the inventive lens assemblies described herein. Any material capable of suitable light transmission or refraction is suitable, including for example, but not limited crystalline and fused materials, glass, polymers, resins, and combinations thereof. One non-binding example is polymethylmethacrylate (PMMA) recognized in the art as an inexpensive but optically suitable material that can be produced with high quality and having excellent optical properties well suited for lighting applications. Other polymers known in the art are also suitable, including meltable (fusion) polymers and resins suitable for injection processing as well as thermoset polymers capable of being molded in place or molded with heat or radiation to complete cross-linking and setting. For embodiments employing linearly contiguous lenses, an extrusion process is a convenient process to fabricate the inventive lens assemblies disclosed herein, including the main extruded lens segment as well as coextruded portions or layers that can be combined to form the light refocusing elements on the lens or immediately adjacent to the lens. In one embodiment, the lens systems as disclosed herein may be individually molded or may be formed contiguously during the extrusion process by using multiple injection nozzles shaped and positioned accordingly to form the portions of the inventive lens assembly as disclosed hereinabove and to add the light refocusing elements onto the main lens or lens assembly. Other processes to produce the inventive lens assemblies that are known in the art, including but not limited to, casting, layering, lamination, molding, 3-D printing and sintering of suitable optical materials are also acceptable for use in the manufacture of the augmented lenses disclosed herein, in order to produce a main lens with the desired light refocusing elements associated therewith and located on or near a first or second surface of the main lens, or located within the main lens portion as an additive element or subtractive element, the latter being a void space, hollow or davit in the main lens material shaped to produce the desired optical effect. In further embodiments, void spaces and shapes in the main lens may be formed using laser ablation, chemical etching, and other acceptable subtractive manufacturing techniques to form the light refocusing elements as disclosed herein. In yet further embodiments, the light refocusing elements (both positive and negative, additive and subtractive, or scattering) may be formed onto a film or layer that is then attached to a mains lens, particularly suitable for non-planar lenses that cannot be easily formed or machined themselves with the desired features, but to which an at least partially flexible film or layer can be applied that bears the disclosed light refocusing elements.

The lens materials may include multiple materials that have different optical properties, but which may be combined together seamlessly or with an optical cement or adhesive to form the compound contiguous lens components or luminaire lens assemblies shown and described herein. The lens materials may be different materials, for example, different polymers or a combination of a center lens of a first material and light refocusing elements present as a second upper or lower additive layer of a second or third material, respectively.

Other treatments for the main lens component are also contemplated in the present disclosure to modify the optical properties as desired. The various lens materials employed can be the same material but have the same or different refractive indexes and other optical properties. In some embodiments, the mains lens portion or region is formed from an acrylic resin or PMMA, but the upper and lower layers are applied as a skim coat to simulate a texture finish on an injection molded process. In a related embodiment, the upper and lower surfaces of a single extruded main lens region is surface treated to effect such a modified optical layer on the selected surface by means disclosed herein. In another related embodiment, positive additive light refocusing elements may be added as an additional layer to either surface of the main lens component, either contiguously or discontinuously to form the disclosed features of a positive element, or yet alternatively negative or subtractive refocusing elements may be formed by applying an additional layer (either continuous or discontinuous) that has appropriately shaped and sized gaps or void spaces to form the disclosed features of a negative element.

In addition, further embodiments include subtractive lenses, or void spaces in the main lens component in the shape of a suitable lens. These void spaces may be formed by any suitable means known, including during the initial formation of the main lens, or by subtractive techniques to remove a portion of the main lens material in the desired size and shape, as well as combinations of additive and subtractive light refocusing elements formed into the main lens material itself, or present as an additive or subtractive feature associated with one or more surfaces of the main lens, or embedded within the main lens material itself, again as either an additive or subtractive feature according to the present disclosure.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and, in a manner, consistent with the scope of the invention, as set forth in the following claims.

The invention claimed is:

1. An augmented lens assembly for use with a light source comprising:
   a main lens component having a first side, an opposed second side, and at least one side edge; wherein the side edge is oriented to receive incoming light from a light source; wherein the opposed second side is oriented to transmit the incoming light from the main lens component;
   a light source located adjacent to side edge of the main lens component;
   at least one light refocusing element disposed on at least one of the first side and the second side of the main lens component; and
   at least one baffle located adjacent to the augmented lens assembly; wherein the baffle comprises a material selected from a light transmissive, non-light transmissive, opaque, semi-opaque, refractive, and reflective material, and combinations thereof; and wherein the baffle extends outward from the opposed second side of the main lens component; wherein the position of the baffle is extendable from a position flush to the second side of the main lens component to a position extending outward from the second side of the main lens component;
   wherein the at least one light refocusing element is characterized by at least one of a subtractive shape and an additive shape, the at least one light refocusing element has at least one surface that is not parallel to either the first side or the second side of the main lens component, and the at least one light refocusing element is positioned along at least one axis of the main lens component; and
   wherein the at least one of the first side and the second side on which the at least one refocusing element is disposed and the at least one of the subtractive shape and the additive shape of the light refocusing element are selected based on a predetermined desired effect on a wavefront of the source light propagating through the main lens component and impinging on the at least one light refocusing element.

2. The augmented lens assembly of claim 1, wherein the at least one light refocusing element is in the form of an optical material selected from the same material as the main lens component, a different material and a void space, and combinations thereof.

3. The augmented lens assembly of claim 2, wherein the at least one light refocusing element has a three-dimensional geometric shape in the form of a lens selected from a cylindrical, concave, biconcave, plano-concave, convex, biconvex, plano-convex, aspheric, spherical, conical, frusto-conical, pyramidal, toric, sphere-cylindrical, and combinations thereof.

4. The augmented lens assembly of claim 2, wherein the at least one light refocusing element has a three-dimensional geometric shape selected from a cone, cylinder, tetrahedron, pyramid, cube, cuboid, polyhedron, prism, rectangular cuboid, rectangular parallelepiped, spheroid, and any other three-dimensional geometric shape; wherein the three-dimensional geometric shape is a projection onto at least one of the first side and the second side of the main lens component.

5. The augmented lens assembly of claim 2, wherein the at least one light refocusing element has a projected two-dimensional shape selected from a circle, ellipse, triangle, square, rectangle, trapezoid, pentagon, hexagon, polygon, rhomboid, and combinations thereof; wherein the two-dimensional shape is a projection onto at least one of the first side and the second side of the main lens component.

6. The augmented lens assembly of claim 2, wherein a location of the at least one light refocusing element on a surface of the first and the second side of said main lens component is selected based on the predetermined desired effect on the wavefront of the source light propagating through the main lens component and impinging on the at least one light refocusing element.

7. The augmented lens assembly of claim 1, further comprising one or a plurality of baffles associated with at least one side edge of the man lens component; wherein the baffle comprises a material selected from a light-transmissive, non-light transmissive, opaque, semi-opaque, refractive, and reflective material, and combinations thereof; and wherein the baffle extends outward from the opposed second side of the main lens component.

8. A luminaire with improved lighting uniformity comprising:
   at least one light source;
   at least one augmented lens assembly configured to receive light from the light source and positioned adjacent to the light source; wherein the augmented lens assembly comprises:
      a main lens component having a first side, an opposed second side, and at least one side edge; wherein the side edge is oriented to receive incoming light from the light source; wherein the opposed second side is oriented to transmit the incoming light from the main lens component; and
      at least one light refocusing element disposed on at least one of the first side and the second side of the main lens component;
      wherein the at least one light refocusing element is characterized by at least one of a subtractive shape and an additive shape, the at least one light refocusing element is selected from a geometric shape having at least one surface that is not parallel to either the first side or the second side of the main lens component; and
      wherein the at least one of the first side and the second side on which the at least one refocusing element is disposed and the at least one of the subtractive shape and the additive shape of the light refocusing element are selected based on a predetermined desired effect on a wavefront of the source light propagating through the main lens component and impinging on the at least one light refocusing element;

at least one baffle located adjacent to the augmented lens assembly; wherein the baffle comprises a material selected from a light transmissive, non-light transmissive, opaque, semi-opaque, refractive, and reflective material, and combinations thereof; and wherein the baffle extends outward from the opposed second side of the main lens component; wherein the position of the baffle is extendable from a position flush to the second side of the main lens component to a position extending outward from the second side of the main lens component.

9. The luminaire of claim 8, wherein a plurality of a space filling combinations of the light source and the augmented lens assembly are positioned adjacent to one another and oriented with respect to one another to completely tile a front surface of the luminaire with a space filling combination of the augmented lens assemblies without a gap; wherein the augmented lens assembly is selected from a geometrical shape selected from a circle, ellipse, triangle, rectangle, square, pentagon, hexagon, polygon, and combinations thereof; and any combinations of two or more geometrical shapes capable of completely tiling the front surface of the luminaire without a gap.

10. The luminaire of claim 8, wherein the at least one light refocusing element has a three-dimensional geometric shape selected from a cone, cylinder, tetrahedron, pyramid, cube, cuboid, polyhedron, prism, rectangular cuboid, rectangular parallelepiped, spheroid, and any other three-dimensional geometric shape bearing a least one flat surface that is coplanar with at least one of the first side and the second side of the main lens component.

11. The luminaire of claim 8, wherein the at least one light refocusing element has a projected two-dimensional shape selected from a circle, ellipse, triangle, square, rectangle, trapezoid, pentagon, hexagon, polygon, rhomboid, and combinations thereof; wherein the two-dimensional geometric shape is a projection onto at least one of the first side and the second side of the main lens component.

12. The luminaire of claim 8, wherein a location of the at least one light refocusing element on a surface of at least one of the first side and the second side of the main lens component is selected based on the predetermined desired effect on the wavefront of the source light propagating through the main lens component and impinging on the at least one light refocusing element.

\* \* \* \* \*